United States Patent
Martin et al.

(10) Patent No.: US 9,171,291 B2
(45) Date of Patent: Oct. 27, 2015

(54) ELECTRONIC DEVICE AND METHOD FOR UPDATING MESSAGE BODY CONTENT BASED ON RECIPIENT CHANGES

(75) Inventors: Daryl Joseph Martin, Kitchener (CA); Conor Michael O'Neill, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 118 days.

(21) Appl. No.: 13/456,910

(22) Filed: Apr. 26, 2012

(65) Prior Publication Data

US 2013/0290435 A1    Oct. 31, 2013

(51) Int. Cl.
| | |
|---|---|
| G06F 15/16 | (2006.01) |
| G06F 15/173 | (2006.01) |
| G06Q 10/10 | (2012.01) |
| H04L 12/58 | (2006.01) |
| H04W 4/12 | (2009.01) |

(52) U.S. Cl.
CPC .............. *G06Q 10/107* (2013.01); *H04L 51/28* (2013.01); *H04L 51/16* (2013.01); *H04W 4/12* (2013.01)

(58) Field of Classification Search
CPC ......... H04L 51/16; H04L 51/28; H04W 4/12; G06Q 10/107
USPC .......................................... 709/206, 224, 203
See application file for complete search history.

(56) References Cited

U.S. PATENT DOCUMENTS

| | | | |
|---|---|---|---|
| 7,945,629 B2 * | 5/2011 | Kritt et al. ..................... | 709/206 |
| 7,979,495 B2 * | 7/2011 | Radenkovic et al. .......... | 709/206 |
| 8,103,726 B2 * | 1/2012 | Stoddard et al. ............... | 709/206 |
| 8,321,558 B1 * | 11/2012 | Sirota et al. .................... | 709/224 |
| 8,352,218 B2 * | 1/2013 | Balla et al. ........................ | 703/1 |
| 8,392,519 B2 * | 3/2013 | Madnani ........................ | 709/206 |
| 2007/0073871 A1 * | 3/2007 | Adams et al. ................. | 709/224 |
| 2008/0005355 A1 * | 1/2008 | Craft et al. .................... | 709/245 |
| 2008/0098072 A1 * | 4/2008 | Jones et al. .................... | 709/206 |

(Continued)

FOREIGN PATENT DOCUMENTS

EP        2410477 A1    1/2012

OTHER PUBLICATIONS

Research Disclosure, Questel Ireland Ltd, "Method to automatically add text to email body when blind carbon copying a recipient for courtesy reasons", disclosed anonymously, Research Disclosure database No. 555077, published in the Jul. 2010 paper journal, pp. 1-2.

(Continued)

*Primary Examiner* — Viet Vu
*Assistant Examiner* — Michael A Chambers
(74) *Attorney, Agent, or Firm* — Rowand LLP

(57) ABSTRACT

A method, device and system are provided for automated insertion of message conversation or thread participant changes in a message body prior to receipt of the message by a recipient of the reply message. Once a reply message is initiated at a first device and an initial recipient set defined for the reply message based on the participants of a previous message of the thread, one or more changes may be made to the recipients specified for the message. In response to a trigger detected at the device, changes to the initial recipient set are identified and indicated by a textual or other notification within the body of the reply message, rather than merely in a header or addressing portion of the reply message. The indication may then be viewable using a recipient messaging client even if header information reflecting the change in recipients is not displayed by the client.

18 Claims, 14 Drawing Sheets

(56) References Cited

U.S. PATENT DOCUMENTS

| | | | |
|---|---|---|---|
| 2008/0301245 A1* | 12/2008 | Estrada et al. | 709/206 |
| 2009/0094240 A1* | 4/2009 | Bordeaux et al. | 707/7 |
| 2009/0132664 A1* | 5/2009 | Radenkovic et al. | 709/206 |
| 2009/0307065 A1* | 12/2009 | Kincaid | 705/12 |
| 2009/0313240 A1 | 12/2009 | Gile et al. | |
| 2010/0017194 A1 | 1/2010 | Hammer et al. | |
| 2010/0198931 A1 | 8/2010 | Pocklington et al. | |
| 2011/0010134 A1* | 1/2011 | Balla et al. | 703/1 |
| 2011/0099242 A1* | 4/2011 | Madnani | 709/206 |
| 2011/0124975 A1* | 5/2011 | Thompson | 600/300 |
| 2011/0145336 A1* | 6/2011 | Carroll | 709/206 |
| 2012/0089692 A1 | 4/2012 | Stoddard et al. | |

OTHER PUBLICATIONS

Extended European Search Report dated Sep. 5, 2012 in EP12165769.6, 7 pgs.

Disclosed anonymously, "Method to automatically add text to email body when blind carbon copying a recipient for courtesy reasons", Research Disclosure database No. 555077, published in the Jul. 2010 paper journal, Questel Ireland Ltd, ISSN 0374-4353, pp. 1-2.

* cited by examiner

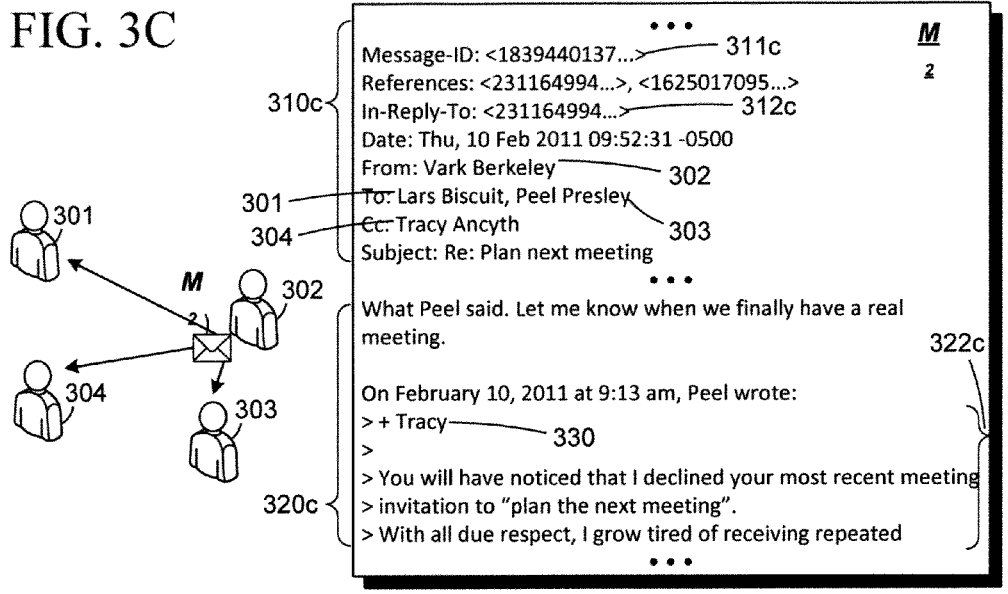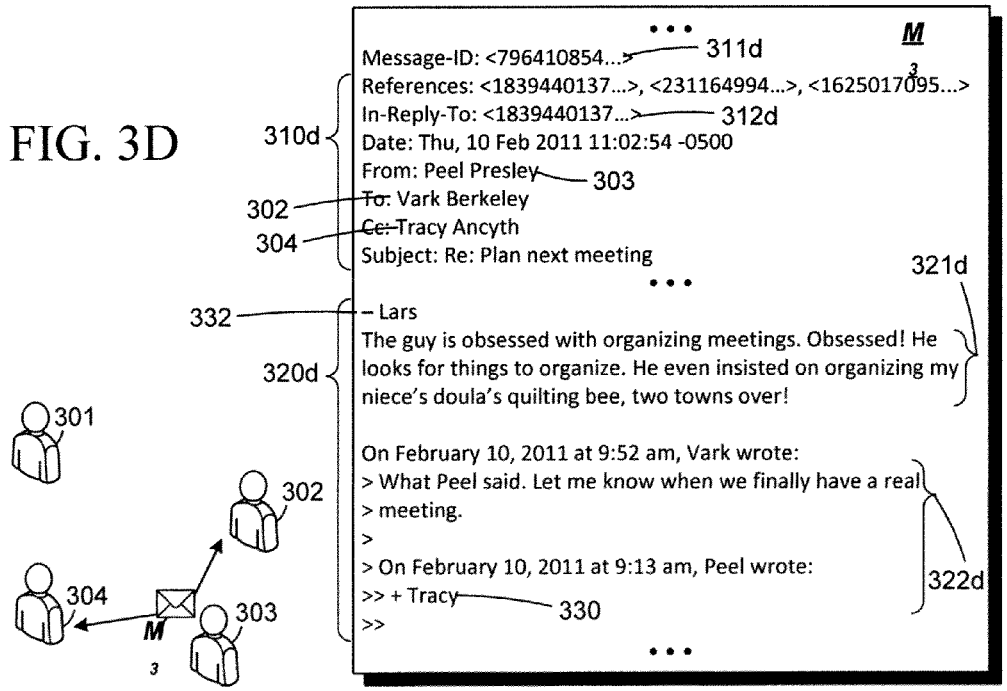

ELECTRONIC DEVICE AND METHOD FOR UPDATING MESSAGE BODY CONTENT BASED ON RECIPIENT CHANGES

TECHNICAL FIELD

The present disclosure relates to updating or alteration of message body content based on changes to a set of recipients for a message.

TECHNICAL BACKGROUND

Electronic devices, such as wireless communication devices, are typically provided with messaging applications for composing, sending and receiving messages such as email (electronic mail), instant messages (IM), short message service (SMS) multimedia messaging service (MMS) and the like. Messages to be sent from an electronic device are typically addressed to one or more recipients (who may also be referred to as "addressees") either automatically by the device, or manually by the electronic device user. When a new message is created in reply to a previous message, for example in response to a "reply" or "reply-all" command received in respect of a previously received message, the default recipients of the new message are typically selected from the set of participants identified in the previous message: the sender of the previous message is designated as a recipient of the new message, and (in the case of a "reply-all" command) any other recipients of the previous message, usually with the exception of the sender of the new message, are likewise designated as recipients of the new message.

When messages are sent to multiple participants in this manner, typical user behaviour is to expect that as new reply messages are generated and sent, all participants in the previous message will obtain a copy of the new message. A sender of a subsequent message, however, may on occasion wish to add or remove one or more recipients from a reply message.

BRIEF DESCRIPTION OF THE DRAWINGS

In drawings which illustrate by way of example only embodiments of the present disclosure, in which like reference numerals describe similar items throughout the various figures.

FIGS. 3A to 3F are schematic diagrams of example communications between a plurality of users.

DETAILED DESCRIPTION OF THE EMBODIMENTS

Figure 1:
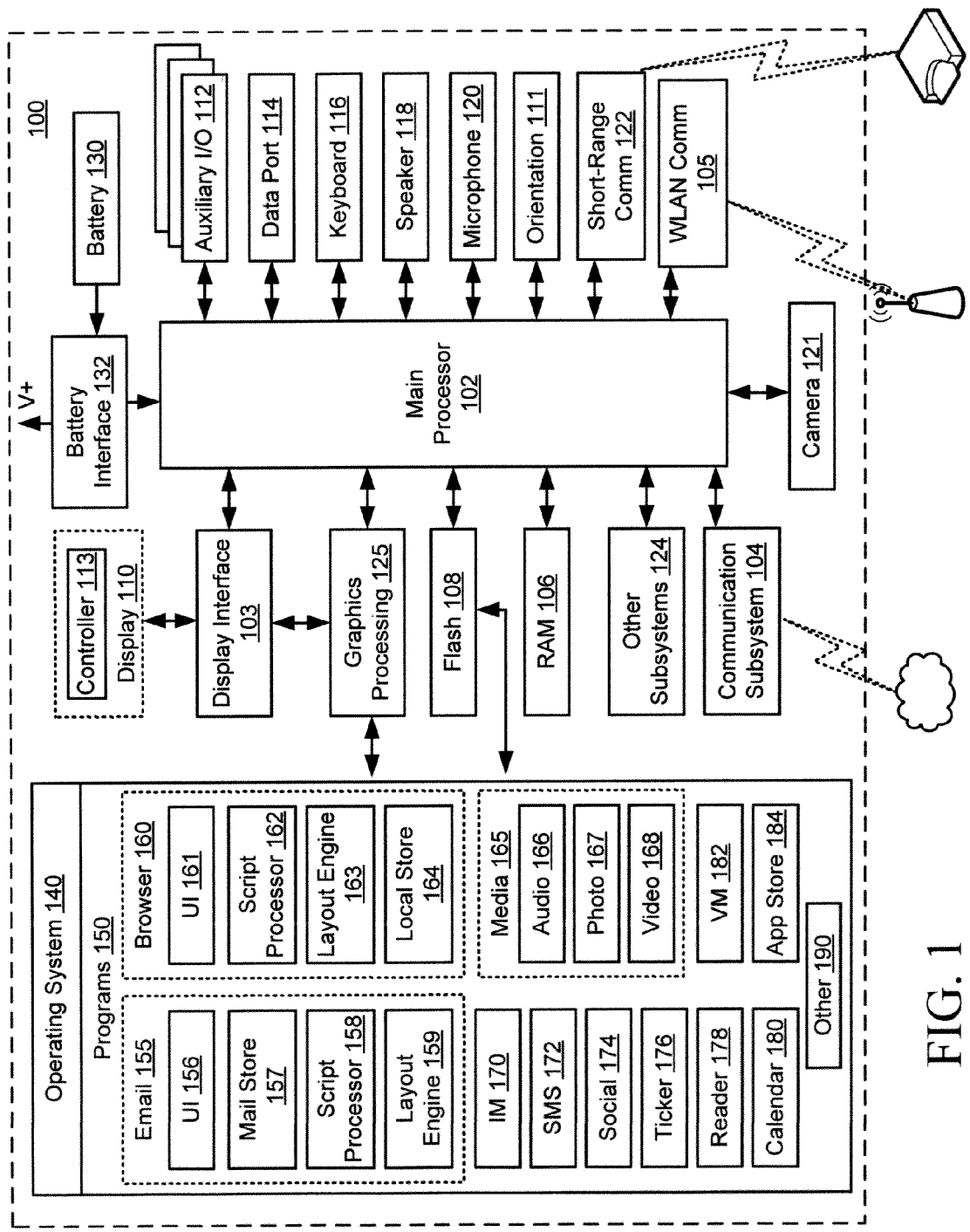
FIG. 1 is a block diagram of an example of an electronic device.

The embodiments and examples herein provide enhanced message generation or composition methods, devices and systems for electronic communications such as email and other message formats in which one or more addressees are selected by a user.

The embodiments and examples described herein provide a method, which may be implemented at an electronic device, comprising: initiating a reply message for editing and sending in response to a previous message, the initiating including specifying an initial recipient set comprising one or more recipients obtained from a set of participants specified for the previous message; receiving input specifying a change to the initial recipient set; in response to a trigger detected at the electronic device, the electronic device: determining any difference between a recipient set currently specified for the reply message and the initial recipient set; and if a difference is determined, inserting an indicator of the difference in a message body of the reply message if no such indicator is already present in the message body; and initiating sending of the reply message.

A possible aspect of these examples is that the reply message and the previous message may both be email messages.

Another aspect is that determining any difference may comprise comparing the currently specified recipient set with the initial recipient set to determine whether any recipients were added or removed from the initial recipient set. In some examples, set of participants comprises a sender and one or more recipients for the previous message, the one or more recipients including a sender of the reply message, and the initial recipient set comprises at least the sender of the previous message, and determining any difference comprises comparing the currently specified recipient identifier set with the set of participants excluding the sender of the reply message to determine whether any recipients were added or removed from the initial recipient set.

Still another aspect is that the initiating includes displaying a message composition screen at the electronic device, the message composition screen including at least one recipient identifier entry field populated using the initial recipient set, and a message content entry field.

Still further, the input is received in one of the at least one recipient identifier entry field, and the trigger comprises a movement of focus away from said recipient identifier entry field.

The trigger may comprise either a received command to validate addresses for recipients of the currently specified recipient set; a received command to send the reply message; or both.

In another aspect, when the difference between the current set and the initial set is removal of a recipient, the method further comprises specifying the removed recipient as an addressee of a blind carbon copy of the reply email message.

Still further, inserting the indicator may be carried out upon receipt of a confirmation instruction.

In yet another aspect, the method further comprises inserting an indicator of the difference in a header of the reply message.

There is also provided a method, comprising: receiving input at an electronic device for a new message to be sent, the input including specification of at least one participant that is added or removed as a recipient of the new message; after the specification of the at least one participant: determining that the new message belongs to an existing message thread; comparing a current set of one or more participants specified for the new message with a previous set of one or more participants specified for a previous message of the existing message thread to determine any difference between the current set and the previous set; and inserting an indicator of the difference in a body of the new message, if a difference is determined; and initiating sending of the new message to the current set of one or more participants.

In one aspect, the new message is a reply to the previous message, the method further comprising, prior to receiving the input: generating a message composition screen for the new message; and specifying an initial set of one or more recipients for the new message, the initial set being obtained from the previous set of one or more participants.

In another aspect, the current set of one or more participants comprises a sender and any recipients of the new message, and the previous set of one or more participants comprises a sender and any recipients of the previous message.

The sender of the new message may be a recipient of the previous message, and the comparing excludes the sender of the new message.

In another aspect, the determining, comparing and inserting are carried out at the electronic device. The determining, comparing and inserting may be carried out in response to a trigger detected at the electronic device. The trigger may comprise receipt of a send command for the new message.

In still another aspect, the inserting occurs upon determination that no indicator of the difference is already present in the body of the new message.

In yet another aspect, the input is received in a recipient identifier entry field in a message composition screen displayed at the electronic device, and the trigger comprises a movement of focus away from the recipient identifier entry field.

There is also provided a system and a communication device, such as an electronic device, which is adapted to implement the methods and variants described herein. In some examples, the electronic device comprises: a display interface; at least one communications subsystem; at least one user interface input mechanism; and a processor in communication with the display interface, the at least one communications subsystem, and the at least one user interface input mechanism, the processor being capable of, in conjunction with other features of the electronic device, implementing the methods described herein.

There is also provided an electronic device-readable medium, which may be non-transitory or physical, bearing or storing code which, when executed by an electronic device, causes the device to be capable of implementing the methods described herein, and/or causes the device to implement the methods described herein.

These embodiments will be described and illustrated primarily in relation to electronic devices, such as tablet computers, smartphones, or any other portable electronic device, which may or may not be equipped to communicate over wireless networks or public networks. It will be appreciated by those skilled in the art, however, that this description is not intended to limit the scope of the described embodiments to implementation on these particular systems. For example, the methods and systems described herein may be applied to any appropriate communication device or data processing device adapted for composition and addressing of messages or the selection of one or more users, recipients, or other delegates, whether or not the device is portable or wirelessly enabled, whether or not it is provided with voice communication capabilities. Additionally or alternatively the device may be adapted to process data and carry out operations on data in response to user commands for any number of purposes, including productivity and entertainment. Thus, the embodiments described herein may be implemented on electronic devices adapted for communication or messaging, including without limitation cellular phones, smartphones, wireless organizers, personal digital assistants, desktop computers, terminals, laptops, tablets, handheld wireless communication devices, notebook computers, portable gaming devices, Internet-connected televisions, set-top boxes, digital picture frames, digital cameras, in-vehicle entertainment systems, entertainment devices such as MP3 or video players, and the like. As expressed in the various examples herein, the electronic device may have an integrated display interface; however, the examples need not be limited to such embodiments. The electronic device may be configured to output data to be painted to an external display unit such as an external monitor or panel, television screen, projector, or virtual retinal display (via a data port or transmitter, such as a Bluetooth® transceiver, USB port, HDMI port, DVI port, and the like). References herein to a "display," "display screen" or "display interface" are intended to encompass both integrated and external display units.

FIG. 1 is a block diagram of an example of an electronic device 100 that may be used with the embodiments and examples described herein. The electronic device 100 includes a number of components such as a main processor 102 that controls the overall operation of the electronic device 100. It should be understood that the components described in FIG. 1 are optional and that an electronic device used with various embodiments described herein may include or omit components described in relation to FIG. 1.

The electronic device 100 may be a battery-powered device including a battery interface 132 for receiving one or more rechargeable batteries 130. Communication functions, including data and voice communications, are performed through one or more communication subsystems 104, 105, and/or 122 in communication with the processor 102. Data received by the electronic device 100 can be decompressed and decrypted by a decoder operating according to any suitable decompression techniques, and encryption/decryption techniques according to one or more various encryption or compression standards known to persons of skill in the art.

If equipped with a communication subsystem 104, this subsystem 104 receives data from and sends data to wireless network 200. In this embodiment of the electronic device 100, the communication subsystem 104 is configured in accordance with one or more wireless communications standards. New wireless communications standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for the wireless communications standard, and optionally other network communications.

The electronic device 100 may be provided with other communication subsystems, such as a wireless LAN (WLAN) communication subsystem 105 or a short-range and/or near-field communications subsystem 122 also shown in FIG. 1. The WLAN communication subsystem 105 may operate in accordance with a known network protocol such as one or more of the 802.11™ family of standards developed or maintained by IEEE. The communications subsystems 105 and 122 provide for communication between the electronic device 100 and different systems or devices without the use of the wireless network 200, over varying distances that may be less than the distance over which the communication subsystem 104 can communicate with the wireless network 200. The subsystem 122 can include an infrared device and associated circuits and/or other components for short-range or near-field communication.

It should be understood that any of the communication subsystems 104, 105, 122 may optionally be included in the electronic device 100. Alternatively, a communication subsystem provided in a dongle or other peripheral device (not shown) may be connected to the electronic device 100, either wirelessly or by a fixed connection such as a USB port, to provide the electronic device 100 with access to a network. If provided onboard the electronic device 100, the communication subsystems 104, 105 and 122 may be separate from, or integrated with, each other.

The main processor 102 also interacts with additional subsystems, if present, such as a Random Access Memory (RAM) 106, a flash memory 108, a display 110, other data and memory access interfaces such as an auxiliary input/output (I/O) subsystem 112 or a data port 114, a keyboard 116, a speaker 118, a microphone 120, a camera 121, the communications 104, 105, 122 and other device subsystems 124. The auxiliary subsystem 112 can include devices such as a mouse, trackball, infrared fingerprint detector, or a roller wheel with dynamic button pressing capability, optical joystick, trackpad, or other user input device. The electronic device may also be provided with an orientation sensor or module 111, used to detect the orientation of the display 110. In the case of a portable (such as a handheld) electronic device 100, display 110 is typically integrated with the device 100, as well as the orientation module 111. In the case of an electronic device 100 where the display 110 is external to the device, the orientation module 111 may be integrated with the external display screen. The orientation module 111 may include any suitable module that may be selected by those skilled in the art, such as an accelerometer which may be used to detect gravity- or motion-induced forces and their direction. For example, the orientation module can have a digital three-axis accelerometer connected to an interrupt and serial interface of the processor 102, or another microcontroller of the device 100 (not shown). The processor 102 or microcontroller determines the device 100 orientation in accordance with acceleration measured by the accelerometer and provides the detected orientation to the operating system, or raw acceleration data measured by the accelerometer can be sent to the processor 102 so that device orientation is determined by the operating system of the electronic device 100. The orientation module 111 may thus be considered to include the accelerometer, microcontroller or those modules of the processor 102 executing to determine orientation. It should be understood that the orientation module 111 may optionally be present at an external display, and provide orientation determination for the display screen associated with the electronic device 100. Whether the orientation module 111 is located at an external display or is located at the electronic device 100 having an integrated display, the orientation determined by the orientation module 111 is related to the orientation of the display screen associated with the mobile device.

The orientation or acceleration detected at the electronic device 100 (or at the external display 110) may be processed to determine a response of the electronic device 100, such as an orientation of a graphical user interface displayed on the display 110 in response to a determination of the current orientation detected. Upon determination of the current orientation or a change in orientation, the operating system may issue notifications to executing applications of the current orientation. Individual applications may register a device orientation event notification listener with the operating system to receive such notifications. Alternatively, applications may query the operating system for the current orientation at defined intervals.

In some embodiments, the electronic device 100 may be a touchscreen-based device, in which the display interface 110 is a touchscreen interface that provides both a display for communicating information and presenting graphical user interfaces, as well as an input subsystem for detecting user input that may be converted to instructions for execution by the device 100. The touchscreen display interface 110 may be the principal user interface provided on the electronic device 100, although in some embodiments, additional buttons, variously shown in the figures or a trackpad, or other input means may be provided. If a touchscreen display interface 110 is provided, then other user input means such as the keyboard 116 may or may not be present. The controller 216 and/or the processor 102 may detect a touch by any suitable contact member on the touch-sensitive display 110.

A visualization processor or module 125 may be included in the electronic device 100. The visualization module 125 analyzes and processes data for visualization on the display 110. Data originally prepared for visualization on a large-screen display may require additional processing prior to visualization on a small-screen display. This additional processing may be accomplished by the visualization module 125. As will be appreciated by those of skill in the art, the visualization module can be implemented in hardware, software, or a combination thereof, and can include a dedicated image processor and associated circuitry, or can be implemented within main processor 102. In some electronic devices 100, particularly those provided with integrated displays 100 (although as noted above, the embodiments herein are not necessarily restricted to only such devices), the processor 102, visualization module 125, and other components are configured to respond to detected changes in orientation of the device 100.

The electronic device 100 also includes an operating system 140 and software components 155 to 190, collectively indicated as programs 150 in FIG. 1. The operating system 140 and the software components 155 to 190 that are executed by the main processor 102 are typically stored in a persistent store such as the flash memory 108, which can alternatively be a read-only memory (ROM) or similar storage element (not shown). Those skilled in the art will appreciate that portions of the operating system 140 and the software components 155 to 184, such as specific device applications, or parts thereof, can be temporarily loaded into a volatile store such as the RAM 106. Other software components 190 besides those explicitly illustrated in FIG. 1 can also be included, as is well known to those skilled in the art.

Software applications may be installed on the electronic device 100 during its manufacture (for example, during initial loading of the operating system 140), or at a subsequent time once the electronic device 100 is delivered to the user. These software applications may be supplied by the electronic device manufacturer or operating system provider, or may be third party applications. The additional applications can be loaded onto the electronic device 100 through at least one of the communications subsystems 104, 105, 122, the auxiliary I/O subsystem 112, the data port 114, or any other suitable device subsystem 124. This flexibility in application installation increases the functionality of the electronic device 100 and can provide enhanced on-device functions, communication-related functions, or both.

The various applications that may be installed on the electronic device 100 include messaging applications, such as the email messaging application 155, instant messaging (IM) application 170, and short message service (SMS) service 172. Various alternatives exist for message applications, as is well known to those skilled in the art. Messages that have been sent or received by the user are typically stored in the flash memory 108 of the electronic device 100 or some other suitable storage element in the electronic device 100. Each message type may have a distinct message store in the device memory. In at least some embodiments, some of the sent and received messages can be stored remotely from the device 100 such as in a data store of an associated host system with which the electronic device 100 communicates. There may be multiple ones of these applications installed on the electronic device 100; for example, a distinct application may be used for each different account provisioned on the electronic device 100, even if the message types associated with those accounts are the same. Other types of messaging applications may be included on the electronic device 100, and other ones of the depicted applications may also provide access to a form of messaging service, such as social networking applications 172. Social networking applications and others are generally configured to receive or retrieve data over a network for presentation to the user, such as the browser application 160, ticker application 176, and reader application 178. The browser application 160 may also be used to access a message service provided over the network.

Other types of software applications can also be installed on the electronic device 100, such as calendar applications 180, media applications 165 for processing and presenting audio files 166, photos and other graphic files 167, and videos 168. One or more virtual machines 182 may be provided on the electronic device 100 for executing applications requiring a runtime environment other than that provided by the operating system 140. A further application 184 may provide access over a network to a vendor site offering software applications for download (and optionally for purchase) to the electronic device 100.

In use, a received signal such as a text message, an email message, or webpage download will be processed by the receiving communication subsystem 104, 105, 122 and input to the main processor 102. The main processor 102 will then process the received signal for output to the display 110 or alternatively to the auxiliary I/O subsystem 112. A subscriber can also compose data items, such as email messages, for transmission over a network.

The communication subsystems 104, 105, 122 may include a receiver, transmitter, and associated components such as one or more embedded or internal antenna elements, Local Oscillators (LOs), and a processing module such as a Digital Signal Processor (DSP) in communication with the transmitter and receiver. The particular design of the communication subsystems 104, 105, 122, or other communication subsystem is dependent upon the communication network with which the electronic device 100 is intended to operate. Thus, it should be understood that the foregoing description serves only as one example.

Text-based content that is rendered for display may be obtained from a document such as a message, word processor document, webpage, or similar file, which is either obtained from memory at the device such as flash memory 108 or RAM 106, or obtained over a network connection. A suitable application, such as a messaging application, viewer application, or browser application, can process and render the document for display in accordance with any formatting or stylistic directives included with the document. FIG. 1 also illustrates possible principal components of the email messaging application 155 and browser application 160. The email message application may include a user interface module 156 for rendering user interface elements for use in display screens of the messaging application; a message data store or mail store 157 (this is considered to form part of the application 155 to the extent that it interoperates with the various application components and may be comprised in application memory, although in practice the mail store 157 may be located in memory 108 in the device 100 in a location distinct from the messaging application code itself); a script processor, plug-in, or virtual machine 158 for executing code snippets, scripts and the like embedded in, received with, or invoked by the message being processed by the application; and a layout engine 159 for generating a rendered version of email messages for output to the display 110.

The browser application 160 includes a user interface engine 161, layout or rendering engine 163, a script processor, plug-in, or virtual machine 162 for executing code snippets, scripts and the like embedded in, received with, or invoked by the webpage being processed. The browser application 160 may also have its own local store 164, allocated to the application from the volatile and/or non-volatile memory 106, 108 of the electronic device 100. In some cases, messaging applications such as the email messaging application 155 are not provided with their own script processors 158 and/or layout engines 159; instead, the processing and layout functionality of the analogous components of the browser application 160 are used. This is particularly the case where the email messaging application 155 and the browser application 160 are provided by the same developer or publisher.

When a document such as a message or webpage is received or retrieved for processing and display, it is processed by the appropriate layout engine, with any scripts embedded in or provided with the document passed to the script processor for execution. The layout engine parses the document to generate a rendered version for output at the display 110. The rendered output may be provided to the visualization module and thence to the display 110.

Figure 2:
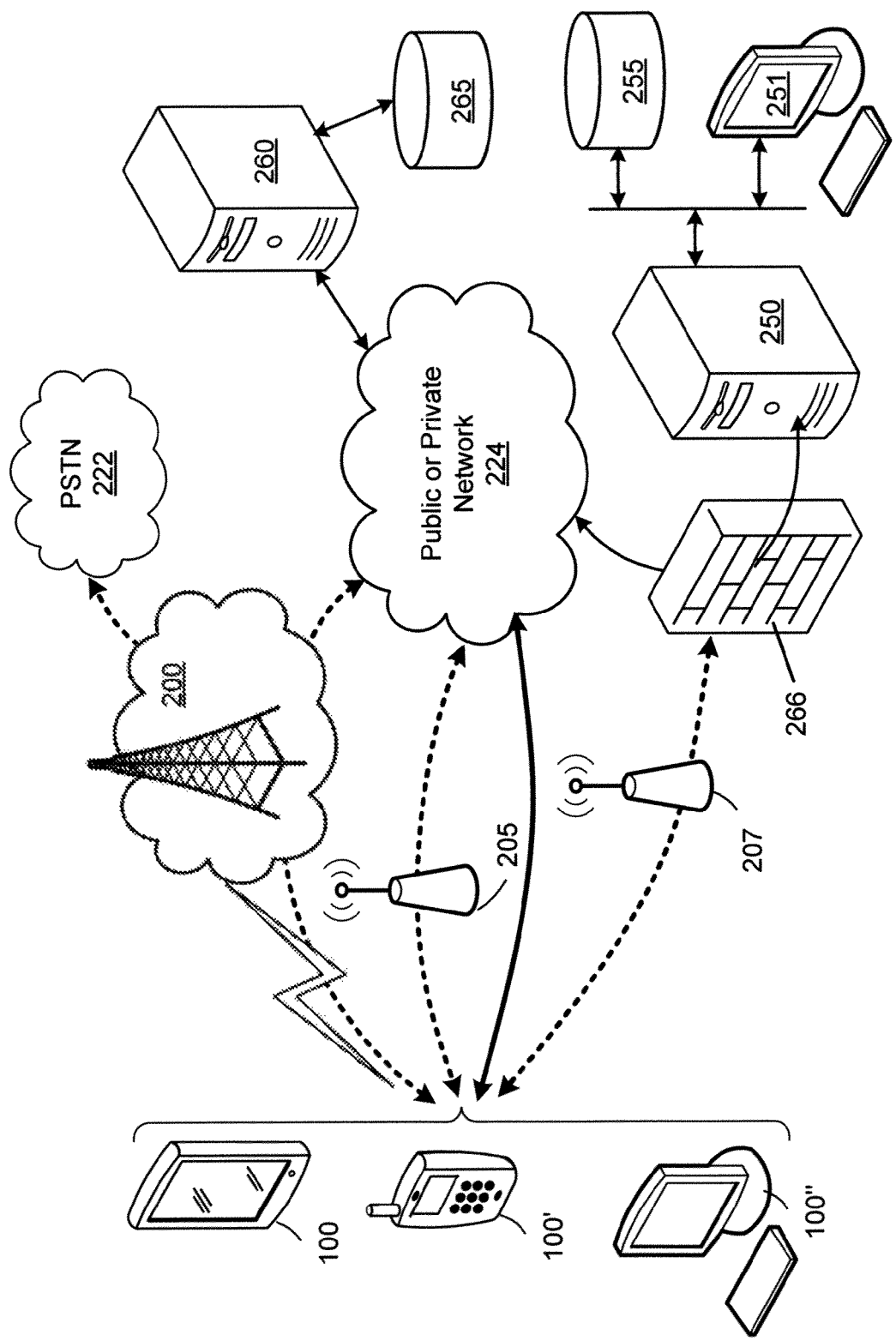
FIG. 2 is a schematic diagram of an example network for use in communicating with the electronic device of FIG. 1.

FIG. 2 illustrates an example of a possible network topology that may be used with the example electronic device 100. It will be understood by those skilled in the art that the schematic of FIG. 2 is merely representative of only particular aspects of a network, and omits other components that are typically included for ease of exposition, such as peripheral devices, routers, mobile data servers, and the like; and further, that the network illustrated herein may include different components and/or be arranged in different topologies than that shown in FIG. 2. A host system may be provided, which can be an own-premises local area network (LAN), or wide area network in communication with LANs, with local computing resources such as one or more servers 250, one or more data repositories 255 and client devices 251 such as terminals or workstations. The servers 250 and data repositories 255 represent controllers, security and information technology policy modules, application servers, messaging servers, file servers, databases, memory devices and the like for providing services to users over the LAN and also over the public or private network 224 to users at their respective electronic devices, and to transmit data (such as messages) to destinations and receive data from outside the host system over the network 224. The host system and its elements will include, as will be appreciated by those skilled in the art, those components generally included in such devices, such as communication subsystems for communicating over one or more fixed or wireless networks, one or more processors, data stores, disk arrays, and the like. The services can include but are not limited to messaging, directory services, collaborative applications, calendaring applications, search engines and file servers, and it will be appreciated by those skilled in the art that the various network components 250, 255, 251 will be adapted for use with those services.

Messaging services are implemented using one or more servers 250 provided with means for storing messages (e.g., a database or a suitable data repository 255) for each message service or format available using the host system, such as email, instant messaging, voicemail, and the like. The server 250 (or a plurality of such servers) and its corresponding data repository 255 can therefore store all received and sent messages on behalf of each user, whether those messages originated inside or outside the host system. In some embodiments, messages sent and received by a user may be stored only locally on the user's client device and not maintained in a persistent store in the host system, while in other embodiments the messages are stored both locally at the client device as well as the server, in which case the message data stores on the client device and the server are synchronized or reconciled periodically. The user device may be any suitable computing or communication device adapted for composition and transmission of messages such as the client devices 251 or electronic devices 100, 100', 100" illustrated in FIG. 2. In fact, a single user may use multiple devices 251, 100, 100', 100" to access the host system services. For ease of reference, a single electronic device 100 is referred to although it will be appreciated by the reader that these embodiments may be implemented using each of the client or electronic devices.

The host system may operate from behind a firewall or proxy server 266, which provides a secure node and optionally a wireless internet gateway for the host system. Client devices such as the electronic device 100 can then access the host system wirelessly through the firewall or proxy server 266, as denoted by the access point 207. External access to the host system by devices 100 may also be provided via a public or private network 224. The device 100 may be configured to access the public switched telephone network 222 through a wireless network 200, which may comprise one or more nodes 202 configured for communication in accordance a suitable mobile telephony standard. In turn, the wireless network 200 provides the electronic device 100 with connectivity to the Internet or other public wide area network 224, and thence to the organization's host system. Alternatively or additionally, if the mobile device is provisioned to communicate over wireless networks that are typically IP-based, such as wireless LANs implementing the Wi-Fi protocol (one or more of the IEEE 802.11 suite of protocols), personal area networks implementing other protocols such as Bluetooth, other wireless networks implementing wireless broadband standards such as WiMAX (one or more of the IEEE 802.16 suite of protocols), and the like, the mobile device 100 accesses the public or private wide area network 224 through a third-party access point, such as the user's own personal access point and Internet connection, or a third party hotspot device, as denoted by the access point 205.

The services above, such as directory services and messaging, can be provided in a self-hosted system as suggested above, i.e., a host system supplied by and managed by the organization itself. However, the person skilled in the art will appreciate that one or more services provided to organization users may instead by provided by third parties in a software as a service, platform as a service, or infrastructure as a service arrangement, colloquially referred to as cloud computing services. For example, email messaging services or collaborative applications can be hosted by a third party service maintaining an external server 260 and data repository 265. Access to the external server 260 can be made available both externally to external client devices such as the electronic device 100, and to client devices 251 within the host system's LAN over the public or private network 224. Regardless, the host system's network services are made available only to those users who possess sufficient credentials to access the services, whether they are accessed internally or externally, and whether provided by the self-hosted or the virtually (externally) hosted system. Each user is therefore provisioned with an account for accessing the host system's services, whether self-hosted or externally hosted by a third party. Messaging services in particular are accessible by the users through client messaging applications executing on the users' electronic devices 100 which communicate with a message server such as the server 250 or 260.

The person skilled in the art will appreciate that the network arrangements and host system described with reference to FIG. 2 comprise only one example, and that the embodiments described herein may be adapted to operate using any appropriate configuration of the organization's host system, any public or private network providing external access to the organization's host system, and regardless whether a user of the domain accesses the host system from within the organization's LAN or externally.

The electronic device 100, 100', 100", other client device 251, and/or the server 250, 260 (or another computing device in the host system) may be configured to implement the methods described herein. These embodiments are described principally with reference to email messages, the general form and construction of which will be known to those skilled in the art. For example, email messages and services may be constructed and implemented in accordance with known Internet messaging standards including Internet Message Format RFC 5322 and RFC 2822, published by the Internet Engineering Task Force, as well as their predecessor, successor, and companion standards. However, compliance with these particular standards is not required; other proprietary or custom formats may be employed instead, but those skilled in the art will understand the general meaning and scope of "email" and electronic messages.

Email is selected for these examples due to its prevalence; however it will be appreciated by those skilled in the art that these embodiments need not be restricted to text-based electronic communication data structures, but can be applied, with suitable modifications, to the addressing of other types of electronic communication data structures. For instance, a meeting invitation or other type of calendar event, or a task item, may be composed by a user of the electronic device 100 and may involve the selection of recipients (e.g., invitees or delegates), as might posts or messages generated and transmitted using social networking applications. Further, rather than using the embodiments and examples described herein to select addressees for a message being composed, they may be applied in other contexts where a selection of one or more users or entities is required, as in the cases of access control or privacy (e.g., the selection of users to be given access to a particular domain, subdomain or document).

The embodiments and examples herein will be described in the context of a sequence of messages passed among a plurality of participants who act as recipients of one or more of these messages, and some of whom act, in turn, as a sender of one or more messages. The "participants" and "recipients" themselves need not be human actors; they may include automated processes, automated attendants, group or corporate messaging addresses, and agents or avatars representing humans or other entities participating in the messages. For ease of reference, however, references to users, participants, addressees, senders and recipients are used herein to generally denote the entities receiving and sending messages, as represented by their respective messaging accounts in the host or other system handling electronic communications, and/or by their respective identifiers (e.g., messaging addresses, friendly or common names, screen names, avatars, or other representations used to programmatically, visually or aurally represent the entity in a messaging system). Thus, for example, specifying a participant or recipient may include the programmatic selection of an identifier corresponding to that participant or recipient for use in a message. Such selection may be done in response to a received command (e.g., a user inputting the recipient's identifier in an input field, or selecting the recipient's identifier for inclusion in an input field), or automatically through execution of a process triggered by another event (e.g., the automated selection of recipients for a new message that is a reply to a previously received email message). The use of language such as "user", "participant", "addressee", "sender" and "recipient" in this context will be well understood by those skilled in the art.

The messages described herein may be members of message "threads", "groups" or "conversations", which are terms used interchangeably in this description. The categorization or grouping of messages as belonging to a single "thread" may be carried out using a variety of different rules and heuristics. A simple method of categorizing messages as belonging to a single "thread" is to assign all messages (in particular, email messages) containing the same subject line (after excluding prefixes and tokens such as "Re:", "Fw:", and other strings denoting that a message is a reply or forward of a previously received message) to one thread; hence the frequent use of the "conversation" paradigm in describing email message threads, since it is presumed that the messages are linked through common topics, as is typical of oral conversation. Another method of grouping parent and child (such as reply and forward) messages together in a thread is to determine whether messages are linked through an "In-Reply-To" or similar value included in the message header, since the value would identify at least the immediately previous message in the message thread. Similarly, the message header may include references to other preceding messages that may be considered to be members of the same thread, or a conversation identifier that is common to all messages belonging to the same thread. Threads, however, can also refer to groups or subcollections of messages that are determined to be related through other specifically defined common message characteristics or attributes. For example, messages that include a specific, predefined string of characters in their subject or body may be determined to belong to a single thread. Determination of thread membership may be carried out by the messaging application, or alternatively carried out by a separate module at the electronic device 100 or at a message server. At the electronic device 100, threading or grouping of messages may be carried out by a conversation or threading manager resident at the electronic device 100, which queries individual message stores as necessary to obtain any message attributes required to determine membership of a given message in a thread. An example of a conversation manager of this type may be found in co-pending U.S. patent application Ser. No. 12/966,077 filed 13 Dec. 2010 (US 2011/0231499), the entirety of which is incorporated herein by reference.

When a user participating in a message thread or conversation initiates a reply to a previous message in the thread, the user's messaging application (which may be a client application executing on the user's own communication device, such as a mobile computing device or desktop computer, or a service executing at a server system accessible by the user) will typically present the user with a message composition screen for inputting message body content for a new message. One or more recipients may also be specified for the reply message; in the case of an email message, the messaging application will typically obtain the sender identifier and identifiers for any recipients (besides the user composing the reply message) from the previous message, and designate them as recipients of the reply message. In a typical email message composition user interface, identifiers for these designated recipients pre-populate one or more recipient identifier entry fields in the message composition screen, so the user need not manually specify these recipients. A portion of the message body content may also be automatically generated by the messaging application, in that content from the previous message may be inserted in a message body content entry field of the message composition screen. As noted above, though, on occasion it may be necessary or desirable to alter the initially specified recipients of the reply message to include one or more new recipients, remove one or more existing recipients, or to change a recipient from one type to another (e.g., in the context of an email message, from a "To:" recipient to a "Bcc:" recipient). The user may thus alter the set of initially designated recipients by adding or removing recipients from the one or more recipient identifier entry fields.

However, once the reply message is sent and presented to the recipients by their respective messaging applications, any changes to the initial set of recipients specified for this reply message may not be readily apparent. The recipient's messaging client may not display a full listing of the participants for the reply message when displaying the reply message content, due to design or available display space constraints; or there may be so many recipients of the reply message displayed that a change of one or two recipient names may pass unnoticed by the recipient. Thus, the recipient may read the reply message with the presumption that the set of participants is the same as it was for the previous message, which is a common presumption, and not be made aware of the fact that the user sending the reply message chose to add or remove participants to the message thread. Failure to bring a change in message participants to the recipient's attention via the recipient messaging application interface may result in the generation and transmission of redundant messages; for example, the recipient may forward the reply message to a further recipient, or create a new reply message to all participants and add the further recipient, even though this further recipient had already received a copy of the message. As another example, the recipient might generate a further reply to the message thread by replying to that reply message with a comment directed at one of the previous participants in the thread, unaware that this participant had been removed in the reply message. Other message thread participants might helpfully reply to the mistaken party to correct their misapprehension, thus causing the transmission of even more messages in the thread. The end result of these redundant messages, of course, is that every participant's message inbox can be unnecessarily cluttered with these numerous follow-up messages, resulting in the consumption of additional storage and computing resources at each participant's communication device and their respective message servers.

To mitigate this problem, the recipient's messaging application could parse the list of recipients specified for the reply message, and compare the recipients to a set of participants associated with the previous message or the message thread in order to display a notification bringing changes to the recipient list to the recipient's attention. In addition to the additional intelligence required at the recipient's device or messaging application, this solution may also require one or a combination of conditions to be met: the full list of recipients of the reply message must be available to the messaging application; the recipient data provided with the reply message must be sufficient for the recipient's messaging application to successfully compare the recipient data with prior messages in the thread; and the recipient's messaging application must have access to previous messages in the thread to carry out the comparison.

However, these conditions may not be met. For example, the recipient might have deleted previously received messages, meaning that comparison of the participants of the current message with the participants of a previous message may not be possible. Although email messages constructed in reply to an earlier message typically include content of that earlier message—which can include identification of the previous sender and recipients of the earlier message in a caption, discussed below—that earlier message content is not always present, since the sender of the reply message might choose to delete or edit the earlier message content, or the copy of the reply message received by the recipient's communication device might but truncated and exclude this content.

Further, the addressee information provided in the reply message may be incomplete. For example, in the case of an email message, recipients may be direct recipients intended as the primary addressee or addressees of a message (typically identified in a "To:" field of the message); secondary recipients receiving a "carbon" copy of courtesy copy of the message (typically identified in a "Cc:" field); and tertiary recipients who likewise receive a carbon or courtesy copy of the message, but who are not expected to take part in the electronic dialogue or whose receipt of the message is not intended to be made known to the other recipients (typically identified in a "Bcc:" field). A copy of the message sent to the primary or secondary recipient of the message will include, in its header, references to the other primary and secondary recipients of the message; however, if there was a tertiary recipient, this information is typically not included in the copy of the message sent to other parties.

Rather than relying on the recipient's messaging application to identify any changes in the message thread participants, then, changes can instead be reflected in the new message body content of the reply message, advantageously in a prominent manner, such that the changes are more evident to the recipient without requiring the recipient's messaging application to be configured to carry out any analysis of the addressees of this or a previous message. An example of a sequence of messages in which this technique is employed is illustrated in FIGS. 3A through 3F.

Figure 3A:
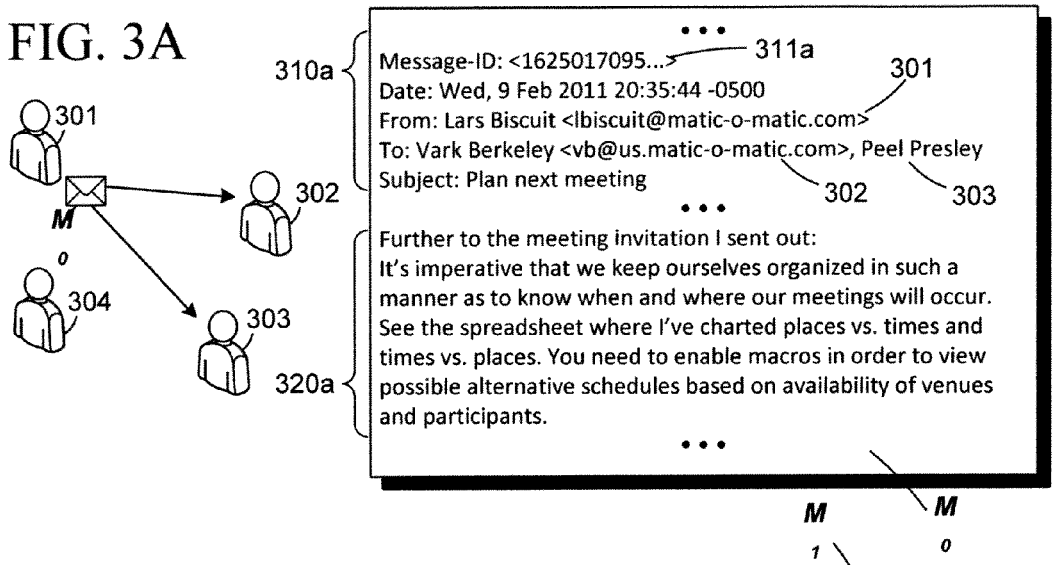

In FIG. 3A, a first email message, $M_0$, is sent from a first user 301 to two initial recipients, 302, 303, as represented schematically by the arrows indicating the direction of transmission of the message within a set of avatars. Example content of this first message $M_0$ is shown, including a message header 310a and a message body 320a. As indicated by the ellipses, other content may be included in the message, but is not illustrated for clarity. As is typical in the art, the message body 320a comprises content composed or selected by the sender of the message 301; the header, which here shown conforms generally to the above-mentioned standard format, is typically automatically generated by the sender's messaging application based on user input and can include a message identifier 311a ("Message-ID") value that provides the message with a unique, or quasi-unique, identity for later reference. The sender (identified in the message header 310a as indicated at 301) may select one or more recipients 302, 303 using techniques known in the art; the sender may input into a recipient identifier entry field provided in a message composition interface the recipient's messaging (in this case email) address, or a common or friendly name that the messaging application associates with the recipient's address based on a lookup or query of an address book or directory database. The address book or directory database may be resident at the sender's communication device (e.g., an electronic device 100) or at a directory or message server located at a host system. The selection of recipients may also be carried out using an "autofill" or "autocomplete" function, in which the messaging application displays suggested recipients retrieved from previous messages sent or received by the sender, matching any content input in the entry field by the sender. An example of this is described in co-pending U.S. patent application Ser. No. 12/755,186 filed on 6 Apr. 2010 (US 2011/0087747), the entirety of which is incorporated herein by reference.

In the accompanying drawings, the recipients 301 to 304 are identified within a message or a user interface (such as a message display or composition screen) using different forms of identifiers that may be considered to be functionally equivalent, in that they are all usable by a messaging application or message server to identify a particular recipient, since these various identifier forms are associated with a messaging address corresponding to that recipient. Thus, for example, the user 301 may be identified by a common or friendly name "Lars Biscuit", by a graphical avatar, or by an email address ("lbiscuit@matic-o-matic.com"). As a consequence of the formatting of electronic messages sent within a host system, in some cases only select forms of identifiers may be included within the message header. The use of a particular type of recipient identifier in these examples is not intended to be limiting.

One or more of the recipients of the message may choose to reply to the original message $M_0$. An example is shown as message $M_1$ in FIG. 3B, in which user 303 (a recipient of the original message $M_0$) sends a reply message with header 310b (including message identifier 311b) and body 320b to recipients 301, 302 and 304. In this example, one or more further reference fields also indicate that the reply message $M_1$ shares thread membership with, or is at least related to, the original message $M_0$. This example header 310b includes a "References" value, which lists the message identifier for the original message $M_0$, and an "In-Reply-To" value 312b listing the same $M_0$ message identifier, thus indicating that $M_1$ is a reply message in response to $M_0$. The insertion of these values need not be mandatory, and is typically carried out by the messaging application generating the reply message.

User 304 was not party to the original message $M_0$, but is now indicate as a "Cc:" recipient of $M_1$. The original set of participants for the first message $M_0$ consisted of users 301, 302 and 303—the sender 301 and recipients 302 and 303— and if the user 303 initiated his reply message using a "reply-all" command (a reply action in which the reply message is addressed to multiple recipients including the sender and recipients of the parent message, usually excluding the author of the reply message as a recipient), then the user 303's messaging application would typically initiate a message composition screen designating only users 301 and 302 as recipients of the new reply message. The addition of user 304 as a recipient, as shown in message $M_1$, is a further step undertaken in response to an instruction by the user 303 to add this new recipient. Thus, the set of participants for the entire message thread $M_0$, $M_1$ has changed, and the set of participants for the new message $M_1$—the sender 303 and the recipients 301, 302 and 304—differs from the set of participants for the original message 301, 302 and 303.

To clarify for other recipients 301, 302 (and to additionally provide a form of explanation to the recipient 304 how they came to receive the reply message $M_1$ when he was not previously a party to the message thread), an express notification or indicator 330 can be included in the message body portion 320b of the message content. As is conventional for email messages, the message body 320b can quote a portion of the parent message, in this case the original message $M_0$, as shown in 320b. This portion of the message may be set off textually or graphically from the new content of the message, 321b; in this example, each line of the quoted content is set off by a preceding token character (a greater-than symbol, ">") and is preceded by a caption providing context, such as one or more of a date or time of the original message, an identifier of the sender of the original message, or recipients of the original message.

The indicator 330 indicates that a further recipient 304 was added as a recipient to this reply message $M_1$, and is considered an addition in that user 304 was not a previous participant in the message thread. In this example, the indicator 330 comprises a token string or component (in FIG. 3B, "+" to indicate an addition), and a recipient identifier component ("Tracy", corresponding to user 304, the further recipient). Generally, in these examples, the indicators are illustrated as text strings; both the token string and the recipient identifier component are characters formatting in the same manner as the balance of the new message content 321b of the reply message. The example token here is an ASCII character that is usually capable of being rendered by any email messaging client regardless of the actual text encoding applied to the message content when the message is prepared for transmission. However, symbols such as addition symbols ("+") or subtraction symbols (as will be seen below) need not be exclusively used. More verbose tokens may be used, such as "plus", "adding [in]" or "bringing [recipient name] into the loop", "cc [recipient name]", which of course need not be limited by language or the particular vernacular used in these examples. Further, the recipient identifier used to identify the participant who was added need not be identified strictly by first name or friendly name; the party's messaging address, avatar, first and last name, nickname, initials or other identifier may be used.

In addition, it will be appreciated by those skilled in the art that these indicators need not be limited to a plaintext-only embodiment. For example, the indicator 330 may also be formatted with a different font face, style, color and/or decoration to further distinguish the indicator from the rest of the message body content. Alternatively, graphic or other multimedia elements may be included in the message body content in place of, or in addition to, the token and recipient identifier. In these examples, though, the indicator is advantageously given prominence by positioning it at the start of any new message body content 321b, so that it is the first message body content viewed when the reply message is presented to a recipient.

A subsequent message $M_2$ may be sent further to the first reply message $M_1$, as shown in FIG. 3C. In this example conversation, user 302, having received $M_1$, has chosen to send a reply message to the other participants 301, 303, 304 identified in message $M_1$. Thus, the message thread participants have not changed since $M_1$. It can be seen in FIG. 3C that this new message again has its own identifier 311c; it is defined as being in reply to the previous message $M_1$ by its In-Reply-To value 312c; and the message body content of the message, 320c, quotes content obtained from the previous message $M_1$ as indicated at 322c. This quoted content includes the indicator 330 that was previously inserted in message $M_1$, given that the indicator 330 was part of the message body content of $M_1$.

The next message in this example conversation, $M_3$, illustrates an example of an indicator 332 when a subsequent message is not sent to all the current participants in the message thread. The participants identified in $M_2$ consisted of all four users 301, 302, 303 and 304; $M_3$, however, is sent by user 303 as a reply to users 302 and 304, but not 301. As this is an email example, again, this new reply message may include quoted content from the parent message being replied to, in this case $M_2$; it will of course be appreciated by those skilled in the art that any subsequent reply message in the thread could be constructed in reply to an earlier message in the thread, potentially with a different participant composition. In this case, though, $M_3$ is indicated as a reply to message $M_2$ based on the In-Reply-To value 312d, which references the previous message's identifier value 311c. Again, the new reply message $M_3$ may include content obtained from the parent message, as shown at 322d; and if so, the indicator 330 from the original reply message $M_1$ earlier in the thread is still present, if the quoted content from that message is still present in the new message $M_3$. The new message content 321d in the message body 320d, this time, includes a new indicator 332 declaring the removal of a previous recipient of $M_2$. As in FIG. 3B, this indicator 332 includes a token indicating the action taken with respect to the recipient (here, a minus sign, "−", indicates removal of a recipient), and a recipient identifier. Again, the token need not be restricted to a symbol as illustrated, but may comprise more verbose statements or strings, such as "removing", "minus", and the like; and the recipient identifier used in the indicator 332 need not use the recipient's first name or friendly name, but may be some other identifier as discussed above.

Figure 3B:
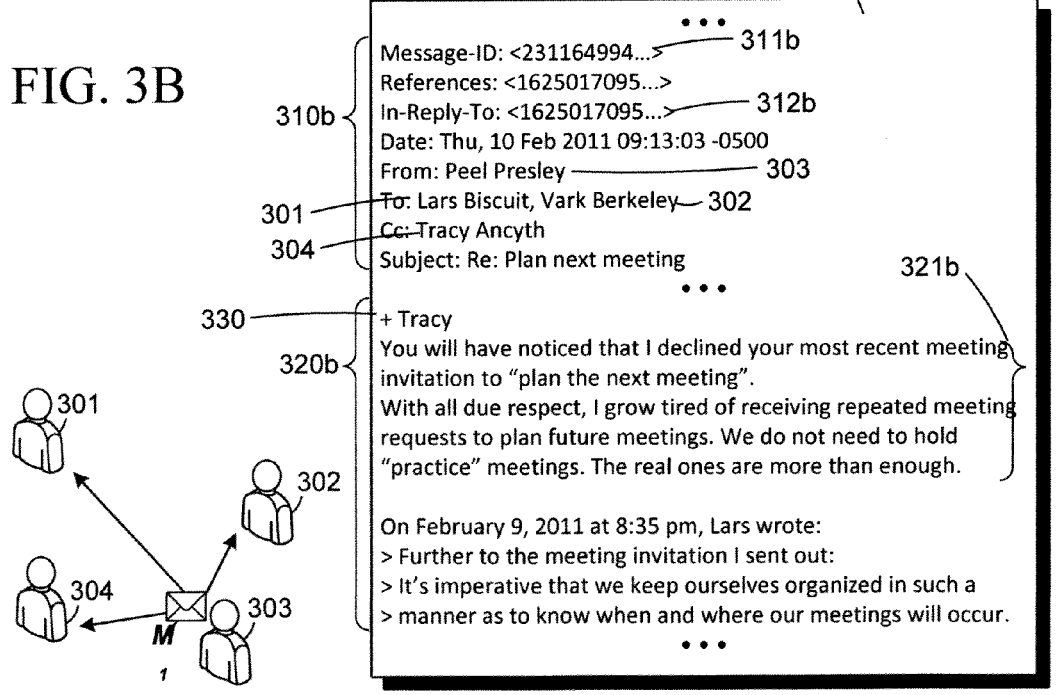
Figure 3E:
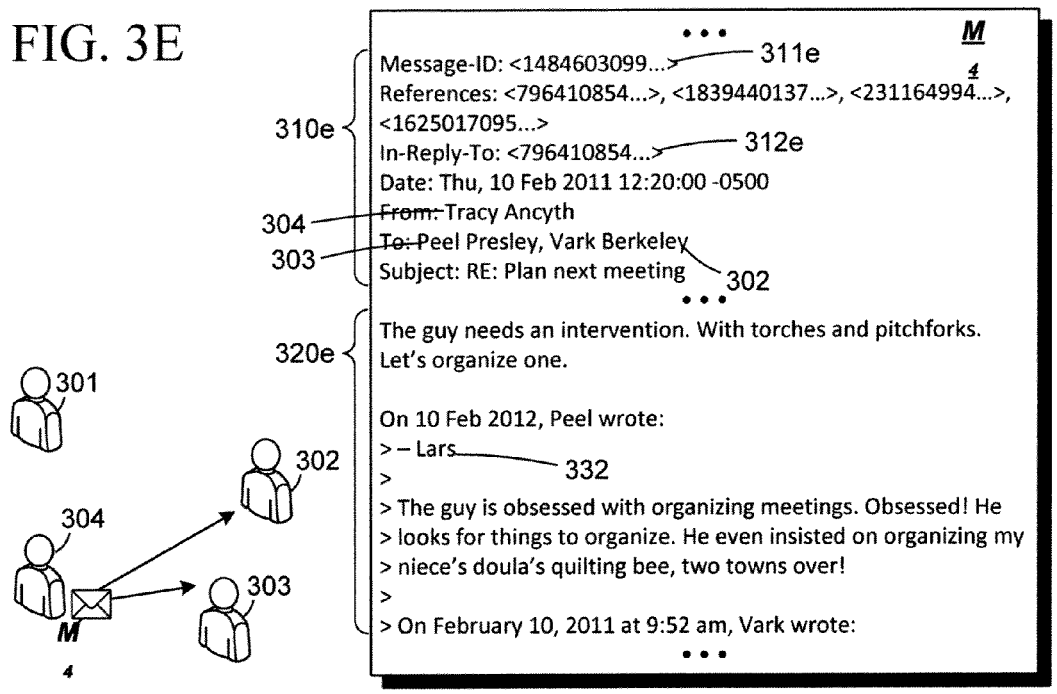

FIG. 3E illustrates a further message $M_4$ sent in reply to $M_3$, this time from the recipient 304 of $M_3$ to the recipients 302, 303. Thus, the participants of $M_3$ and $M_4$ remain the same: for $M_3$, 303 (sender), 302 and 304 (recipients); for $M_4$, 304 (sender), 302 and 303 (recipients). Continuing with the use of In-Reply-To value as a possible indicator of message relationship, the value 312e references $M_3$'s message identifier value 311d. The message body 320e, which may include content obtained from the message body 320d of the parent message $M_3$; thus, the indicator 332 may still be present as quoted content in the current message body 320e.

Figure 3F:
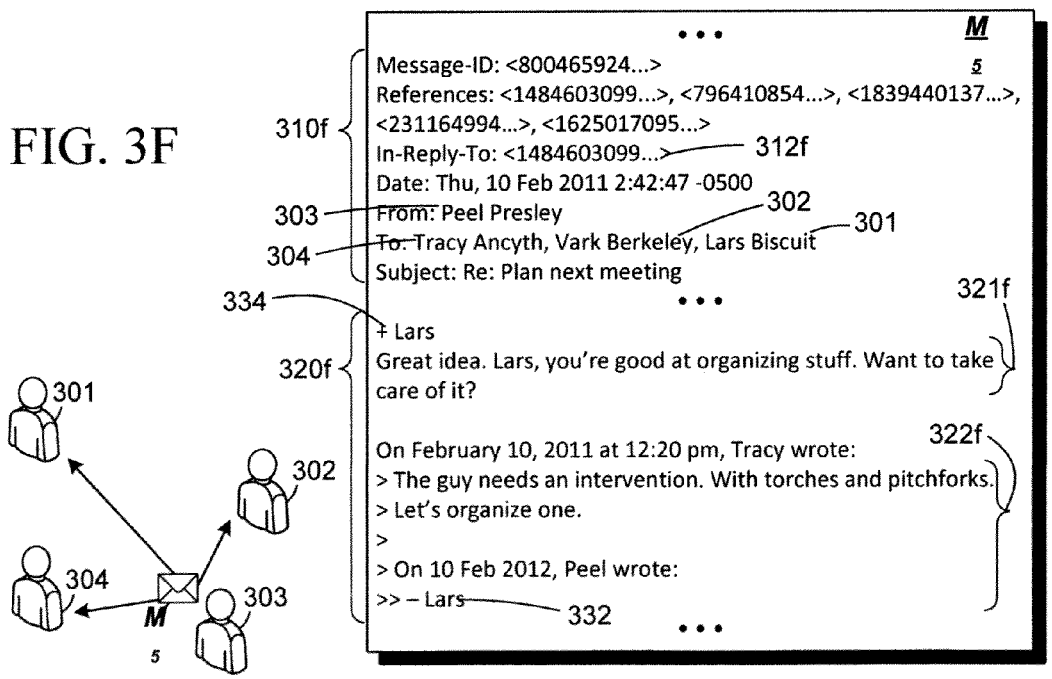

Finally, FIG. 3F illustrates a final message $M_5$ sent in reply to $M_4$. This message identifies at 312f that it is in reply to the previous message $M_4$, by referencing $M_4$'s message identifier 311e. $M_5$ is sent to recipients 301, 302 and 304 by sender 303, who was a recipient of the previous message $M_4$. Thus, the participants identified in message $M_5$ are different than $M_4$, as one participant, 301, was not a participant of $M_4$. The new message body content 321f in the message body 320f of $M_5$ thus includes a further indicator 334, indicating the addition of a new recipient similar to FIG. 3B. Again, quoted content from the parent message, $M_4$, may be included, as shown at 322f; this previous content can therefore still include the last indicator 332, and if the entire message thread is copied within message body 320f, then even the first indicator 330 may be included in the message body 320f. Thus, each new reply message includes an indicator 330, 332 or 334, as necessary, declaring a change to the participants in the current reply message as compared to the parent message of that reply message; and if each reply message includes the full message thread as quoted content (such as 322f), then the message body may also include, effectively, an audit trail showing the changes in recipients to the previous messages in the thread that might not have been reflected in the captions setting off quoted message content (such as the line "On Feb. 10, 2011 at 12:20 pm, Tracy wrote:" in FIG. 3F, which identifies the sender but not the recipients of that previous message). Recipients of the various messages in the conversation can then see the changes made to the set of participants with each subsequent message in the thread, without requiring a specialized messaging application capable of tracking these changes based on message header data.

The examples of FIGS. 3A to 3F illustrated simple cases in which one recipient was added or removed. However, individual changes to the recipients as described above may be combined; for example, if multiple recipients are added and/or removed, a separate indicator may be inserted for each, either on the same or separate lines of the message body content. Further, a single indicator may consolidate multiple additions or subtractions, or combine additions and subtractions. Thus, when multiple recipients are added or removed, an indicator may consolidate the multiple recipient identifiers with a single token, such as "adding Tracy and Lars" or "-LB, PP" In other examples, different changes can be consolidated in a single line, such as "adding Tracy, removing Lars". Further, a similar technique may be employed when a child message forwards the parent message, rather than replies to the parent, where the recipients of the forwarded message still include a number of the participants identified in the parent message.

The examples here also include new message content beyond the indicator 330, 332, 334 in the message body of the reply messages. It will be understood by those skilled in the art, though, that additional message body content need not be added in one of these reply messages; for example, the purpose of the reply message may simply be to remove a recipient, so that the remaining participants can continue the electronic conversation without besetting that party with needless messages; or to add a recipient so that this recipient can keep abreast of the conversation. In that case, the message body content may include only the indicator 330, 332, 334. Further, the reply message may include an attachment in addition to, or in place of, any message body content besides the indicator.

Since (particularly in the example of email) different classes or types of recipients may be specified (direct or To: recipients, courtesy copy or Cc: recipients, and blind carbon copy or Bcc: recipients), the tokens may specifically identify how a recipient is added, such as "+Tracy (to)", "+Peel (cc)", "+LB (bcc)", "Bcc Lars", and so forth. Messages including recipients in the Bcc: list may receive a copy of the message with the Bcc: recipients indicated in the indicator line.

Insertion of indicators, such as 330, 332, 334 and other examples, can be carried out manually by the user while inputting content for the message body of the reply (or forward) message and inputting changes to the recipients designated for the reply message. However, it is possible that in the midst of editing message body content or the recipients of the message, the user may neglect to insert the indicator in the message body. Accordingly, the user's communication device (e.g., electronic device 100) or other device providing messaging application functions for the user composing the reply message may automatically determine when to include such an indicator, and to insert the indicator in the message body as appropriate. The operation of such a device or messaging application is described with reference to various user interface screens, starting with FIG. 4A.

Figure 4A:
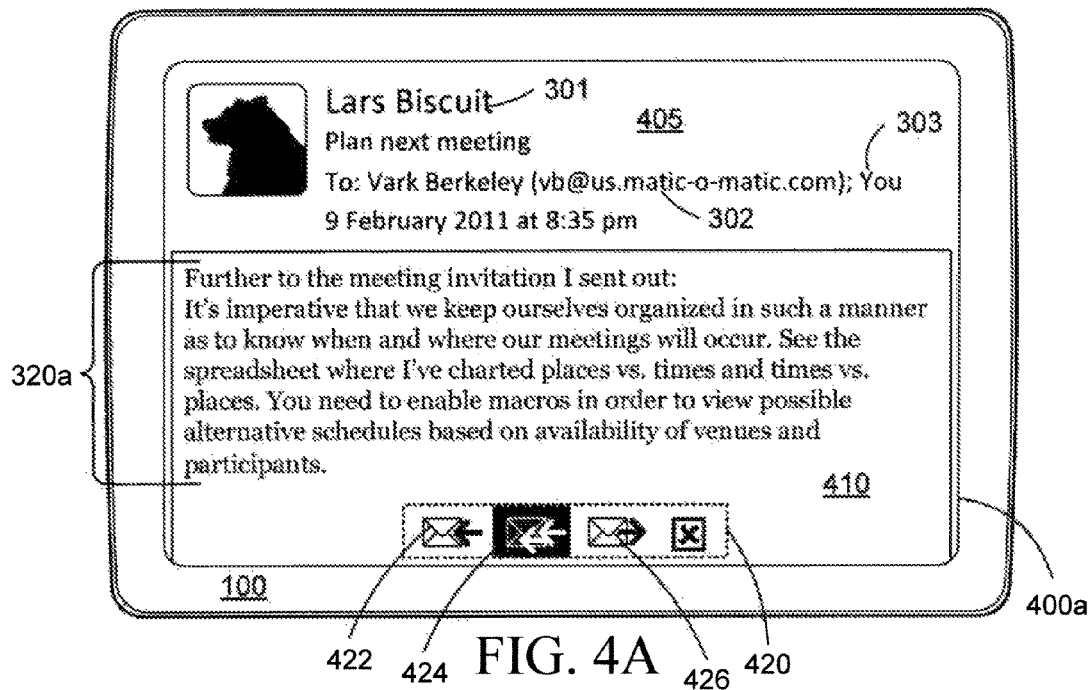
FIGS. 4A to 4F are illustrations of example message display and composition screens depicting automated insertion of an indicator of a recipient change when a recipient is added.

FIG. 4A illustrates an initial view 400a of a received message, in this case $M_0$ of FIG. 3A. This particular message display view 400a is a distinct screen from a message composition screen or inbox listing screen; however, it will be understood by those skilled in the art that the relevant features of this particular view 400a may be provided in an alternate user interface screen, such as an inbox listing screen or message preview screen. In particular, message display view 400a includes a user interface element collection 420 comprising user interface elements representing one or more message actions, in this case reply 422, reply-all 424 and forward 426, in addition to a delete action. Other actions may also be included in the user interface element collection 420, such as save, file, flag, and so forth. In this particular message display view 400a, a header display region 405 includes a display of select header information, including the sender 301, the other recipients 302, 303, subject line and timestamp information; and message body display region 410 includes content from the message body 320a. In this example, the user interface element 424 representing the reply-all command is highlighted, indicating that this command has been selected; the reply-all command may be selected using different means besides the selection of the user interface element 424, such as keyboard input, voice command, menu selection, and so forth.

Figure 4B:
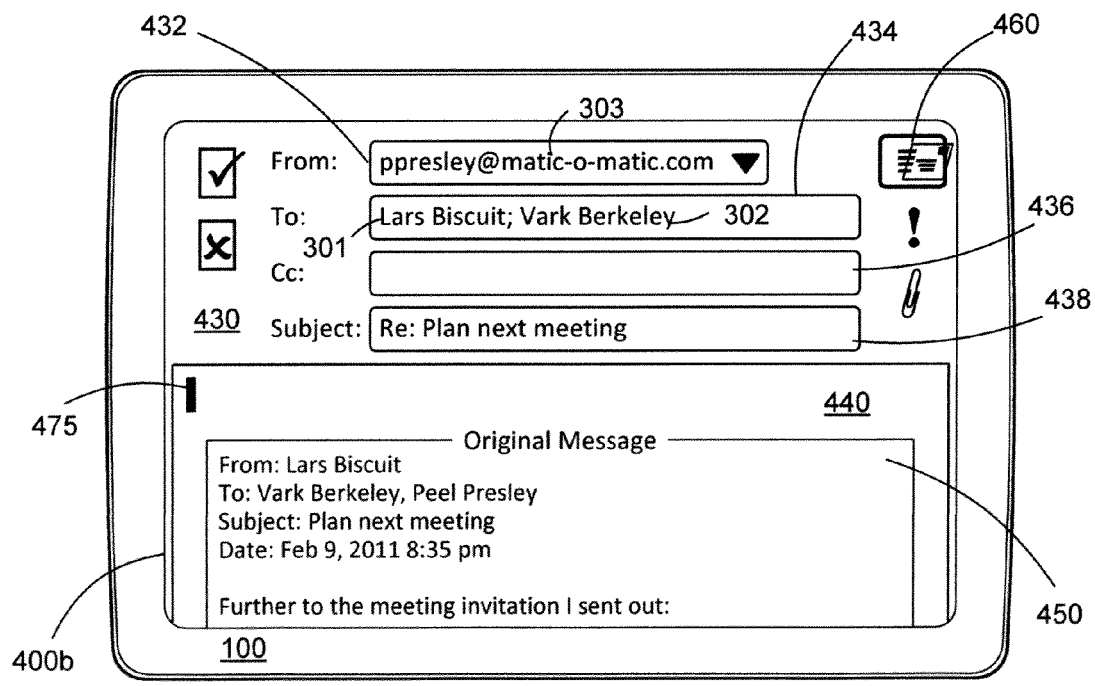

In response to the selected reply-all command, a new message composition screen is displayed. A typical composition screen 400b is illustrated in FIG. 4B, including a first region 430 including user interface elements corresponding to message header and message characteristic fields, such as the sender identifier entry field 432, and one or more recipient identifier entry fields 434, 436. This first region 430 can include user interface elements for message actions, such as a send command user interface element 460. The remainder of the screen 400b includes a message body entry field 440, in which message body content for the reply message may be input. Optionally, the field 440 may include a region 450 containing content obtained from the parent message (in this case, $M_0$), which can include a caption—in this example, the caption includes a listing of the sender and recipients of the parent message, although as illustrated in FIG. 3B, this is not always the case—as well as message body content. This parent message content region 450 is shown in FIG. 4B as being visually distinguished from the remainder of message body entry field 440, but in some message composition screens, there may be no visual distinction. The inclusion of region 450 and its content is optional; the messaging application may be configured to not include this region unless in receipt of a specific command from the user, or the user may optionally delete this region and content if it was automatically inserted.

The sender identifier entry field 432 shown in the message composition screen 400b is not always included in composition screens. In some instances, the user may have an option of choosing a different sending address (e.g., a work email address versus a personal email address), which may be input or selected in the field 432. In some examples, this option may be available, but not via a user interface element in the composition screen. This field is illustrated here to demonstrate that the sender of this new reply message, user 303, is one of the participants in the original message illustrated in FIG. 4A.

In the case of an email message, there may be multiple recipient identifier entry fields such as the To: field 434 and Cc: field 436. Optionally, other recipient identifier entry fields, such as a Bcc: field, may be included as well. A conventional design of an email message composition screen includes at least one recipient identifier entry field together with the message body entry field 440; however, in some examples, the composition screen may include only the message body entry field 440 and optionally user interface elements representing message actions, and the specification of recipients for the message may be implemented through other means, such as a separate input user interface element that is displayed as a discrete input screen or overlaying the message body entry field 440 only in response to user command, or prior to (or after) editing the message body content. The recipient identifier entry field or fields are, in the case of a reply message, automatically populated with recipient identifiers determined from the parent message. In this case, since user 303 (deemed to be the sender of this reply message) received this message from user 301, and was a co-recipient with user 302, both users 301 and 302 are specified as recipients of this new reply message in the reply identifier entry field 434. This specification is carried out automatically by the messaging application in response to the reply-all command. Thus, the initial recipient set for this reply message was determined from the set of participants of the parent message $M_0$, and comprises the set of participants excluding the sender of the reply message.

In FIG. 4B, the message composition screen 400b is shown as being ready for input in the message body entry field 440. This is indicated, in these drawings, by the presence of the cursor or insertion point 475. There are other means to show that a particular field or user interface element is in focus, so the use of the cursor 475 is not intended to be limiting. The meaning of "focus" will be understood by those skilled in the art, but can include, as in FIG. 4B, the state of being capable of receiving user input, such as text input in message body entry field 440. The movement of focus from one field or element to another will also be understood by those skilled in the art; this movement may be carried out by user input, for example by tapping the desired field or element (in the case of a touchscreen interface), or by moving the cursor using a pointing device such as a mouse, touchpad, trackball and the like to the desired target field or element, then "clicking" (e.g., initiating a mouseclick or mousedown event, tapping a button, pressing an enter key, and so forth).

Figure 4C:
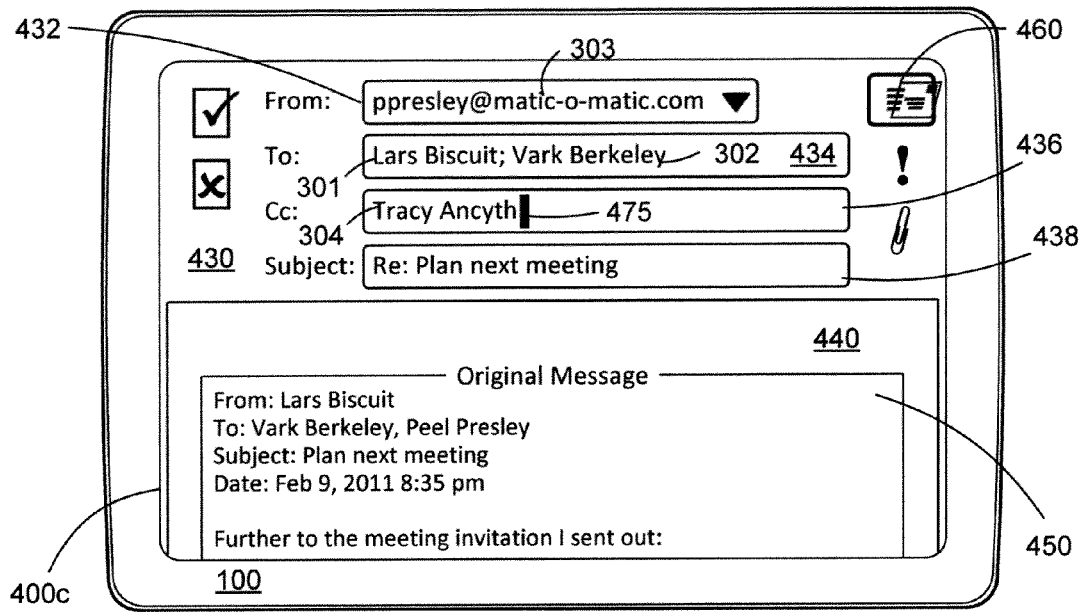
Figure 4D:
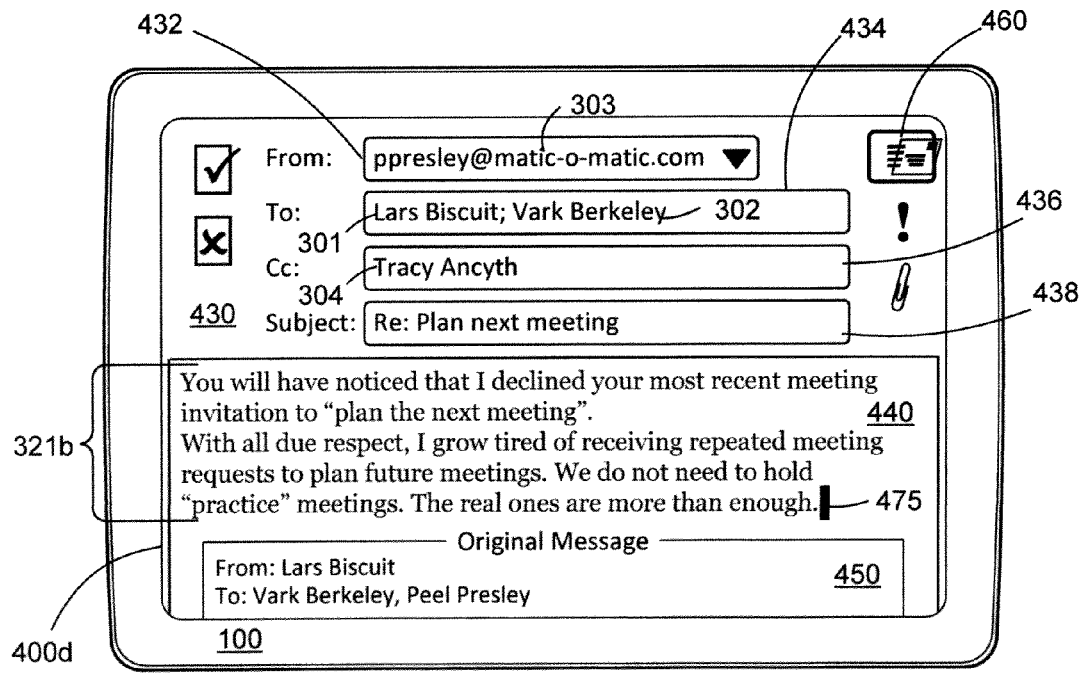

During the message composition phase, the user 303 in this example may choose to add another recipient, in this case user 304 as shown in the message composition screen 400c in FIG. 4C. To do so, the user would cause focus to be moved to the appropriate recipient identifier entry field 436, 438—in this case the latter field 438, as shown by the current position of cursor 475—and insert a recipient identifier using techniques described above. In this case, the friendly name "Tracy Ancyth" has been inserted, and the messaging application may then correlate this friendly name to an email address. Then, in the next message composition screen 400d shown in FIG. 4D, focus is moved back to the message body entry field 440, where message body content is input.

These two user input events—the modification of content in the recipient identifier entry field 436 and the modification of content in the message body entry field 440—may be carried out in the reverse order, or may be carried out alternately, with the user editing some content in the message body entry field 440, then adding the new recipient, and then returning the first field to continue editing the message body. Regardless, when the user is ready to take some message action, such as saving or sending the message, the invocation of the message action will trigger an automatic determination of any differences between the current recipient set specified for the reply message (e.g., as it was changed in FIGS. 4C and 4D) and the initial recipient set as shown in FIG. 4B. In this example, the trigger is the detection of the send command, for example by actuating the user interface element 460. At this point, the messaging application may implement this determination by comparing the current recipient set (in this case, recipients 301, 302, 304), with the initial recipient set. The current recipient set may be obtained from the data currently entered in the recipient identifier entry fields 434, 436. The initial recipient set may have been previously stored for the purpose of carrying out this comparison, at the time the initial message composition screen had been generated; however, in another example, the initial recipient set may be re-determined by retrieving the participant information from the parent message. The comparison at this point would then identify the addition of the user 304 as a recipient. All of the examples provided herein, of course, may be implemented in cases where multiple recipients have been added, and/or where one or more recipients have been removed.

Optionally, when an addition is detected, the messaging application may solicit user input to determine whether to edit the message body content to include an indicator (such as indicator 330) or not. An example of a dialog box 480 that may be displayed is shown in the screen 400e of FIG. 4E. The dialog box 480 identifies the detected difference, and provides the options of sending the message as in 482; inserting an indicator and then sending 484; or cancelling the send action and returning to the message composition screen 486. Thus, the user is presented with the option of executing the action in response to the trigger (i.e., sending the message); inserting the indicator and then executing the action; or cancelling the action responsive to the trigger. The proposed indicator depicted in the dialog box 480 may be constructed using preconfigured token symbols or language, and by correlating the input recipient identifier for the new recipient with a convenient handle or name (in this case, the first name "Tracy").

Figure 4E:
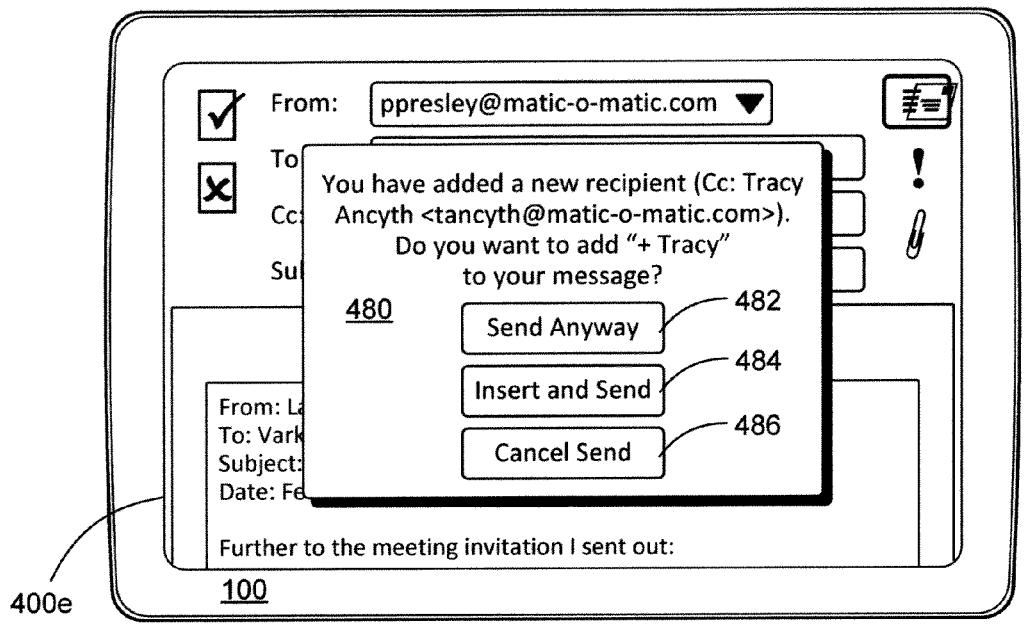
Figure 4F:
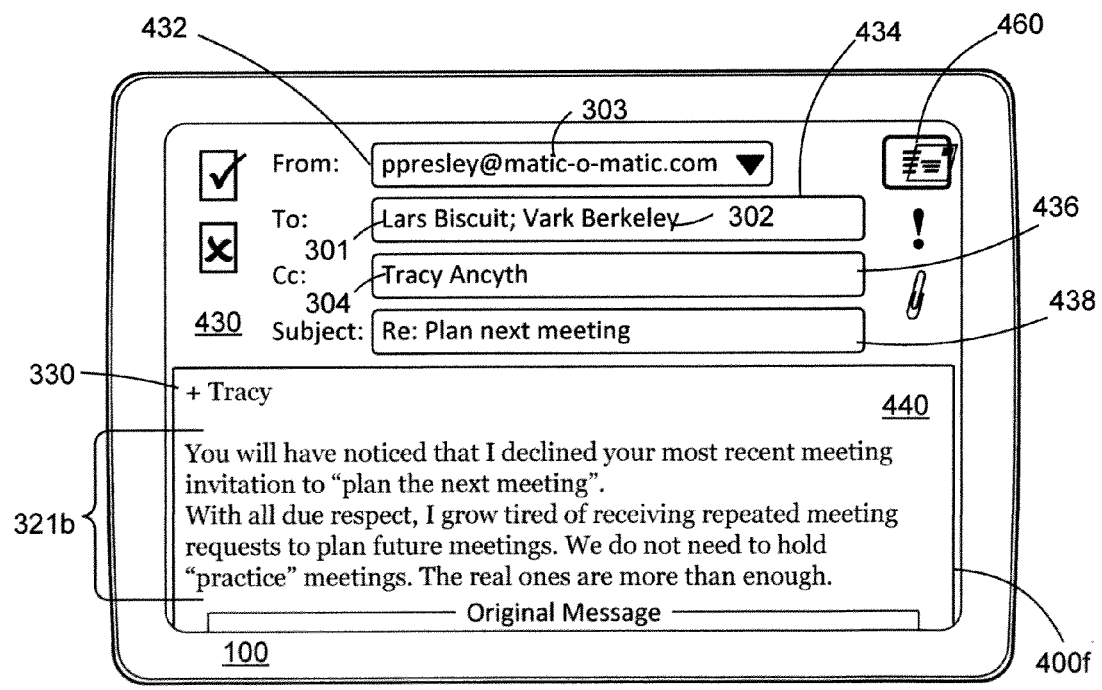

If the user selects insertion of the proposed indicator as an option, the message may appear as shown in the message composition screen 400f in FIG. 4F, with the indicator 330 now inserted at the beginning of the message body content 321b in the message body entry field 440.

In some examples, the confirmation step shown in FIG. 4E in which the user's input is solicited may not occur; the messaging application could instead automatically insert the indicator 330 by default. This default setting may be configured by a user or administrator. Generally, however, it is useful to provide the user with an opportunity to confirm the insertion of the indicator 330 either expressly, via confirmation input (e.g. the selection of the "insert and send" option 484) or impliedly, such as in the manner illustrated in FIGS. 5A to E.

Figure 5A:
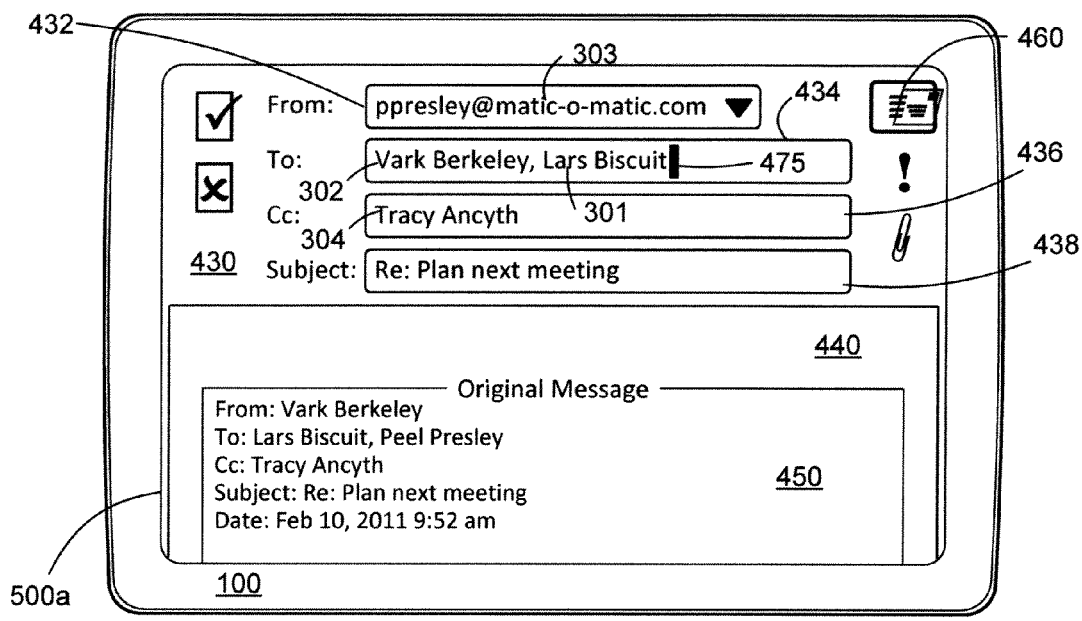
FIGS. 5A to 5D are illustrations of example message composition screens depicting automated insertion of an indicator of a recipient change when a recipient is deleted.

FIG. 5A illustrates the message composition screen 500a in a possible state occurring after a reply-all command was invoked in respect of message $M_2$. In this case, the recipient identifier entry fields 434, 436 have been pre-populated with an initial recipient set (recipients 301, 302 and 304) determined from the participants of the parent message $M_2$, and now focus has been moved to the first recipient identifier entry field 434 as shown by the cursor 475, where the second To: recipient, user 301, is then deleted.

Figure 5B:
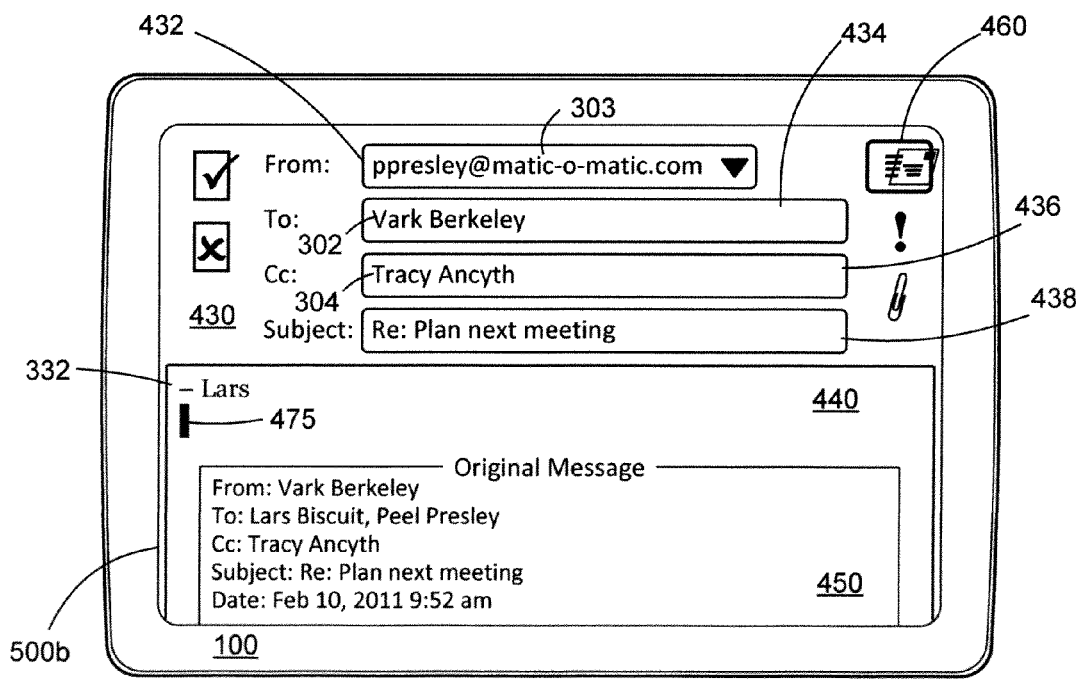

However, when focus is moved to the message body entry field 440 as in the subsequent screen 500b of FIG. 5B, the messaging application automatically engages in the comparison described above to determine whether there are any differences between the currently specified recipient set, which now consists of users 302 and 304 only, and the initial recipient set. In this case, the difference is the removal of user 301 as a recipient. Accordingly, in response to the detection of the movement of focus to another input field of the screen 500a, the determination is carried out, and any appropriate indicator (here, indicator 332) is automatically inserted into the message body entry field 440. Since focus was moved to the field 440, as indicated by the position of the cursor 475, it is likely that the user composing the message will be adverted to the insertion of the indicator 332, and can delete or edit the indicator 332 if it is not desired. Use of the movement of focus as the triggering event in this manner thus causes the determination and insertion of the indicator to occur at a point during message composition when the user is likely to have their attention directed to the general location on the screen—the message body entry field 440—where the indicator will be added, and may avoid the need to expressly solicit user input (e.g., via the dialog box 480).

In the above example of an implicit confirmation, the messaging application may store a flag indicating that the present recipient set (i.e., users 302 and 304) had been confirmed with the user. Thus, in the event that further changes are made to the recipient set, the application need not re-confirm whether the indicator 332 of this particular recipient removal should be included. But in a further example, the messaging application is configured to require express confirmation for the insertion of an indicator (via a dialog box, for example) in those cases where implicit confirmation is not received or where no other triggering event has occurred to cause the comparison of the currently specified recipient set with the initial set. This is illustrated in FIGS. 5C to E.

Figure 5C:
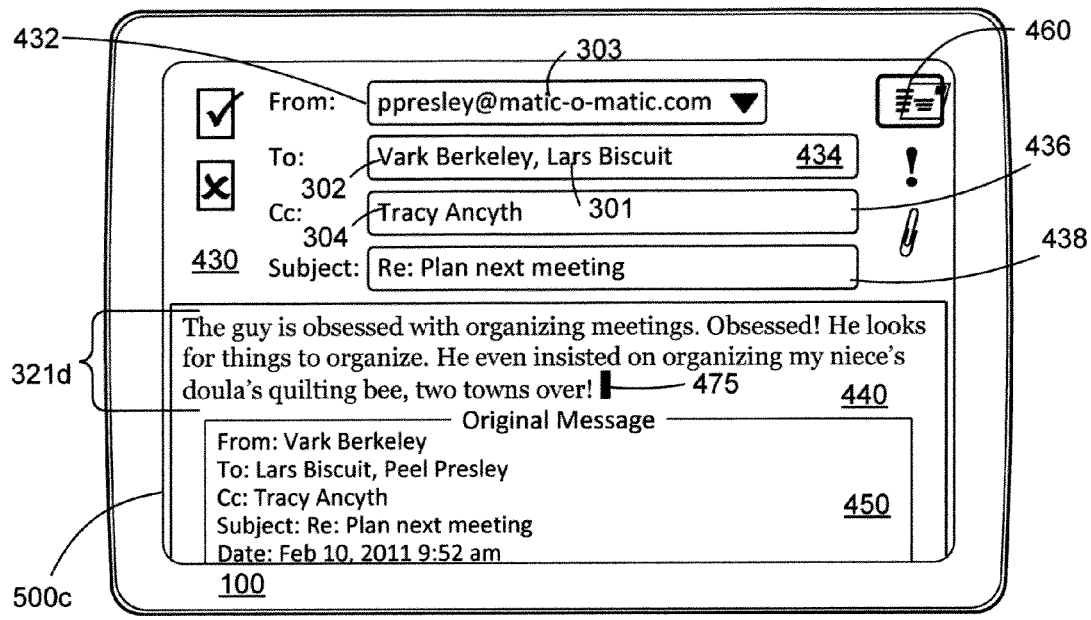
Figure 5D:
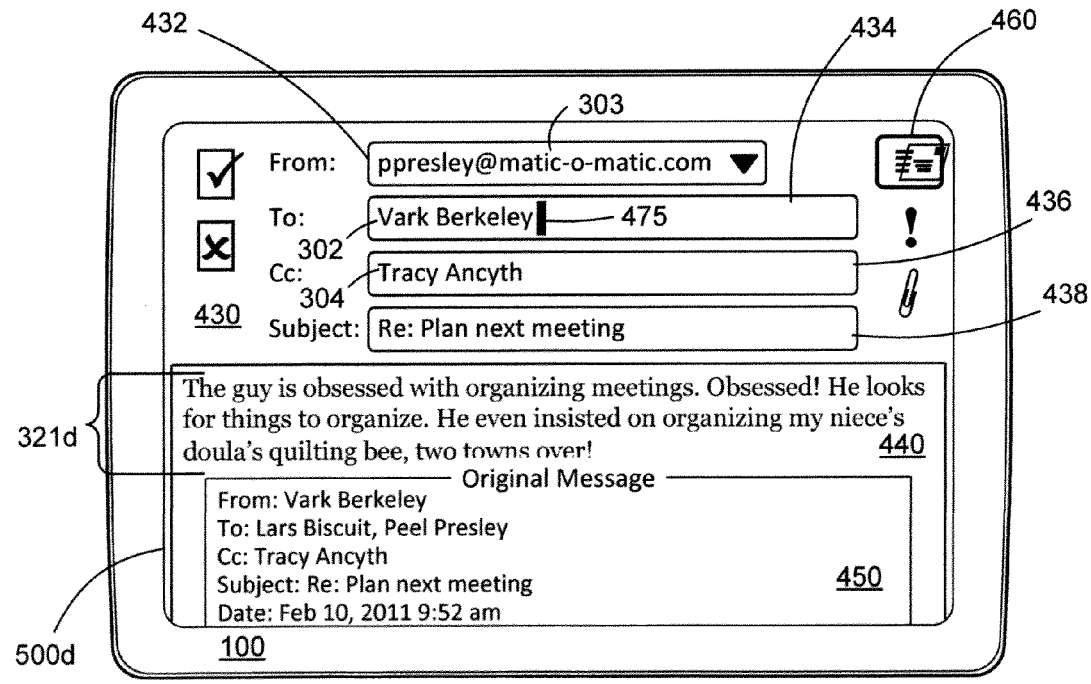
Figure 5E:
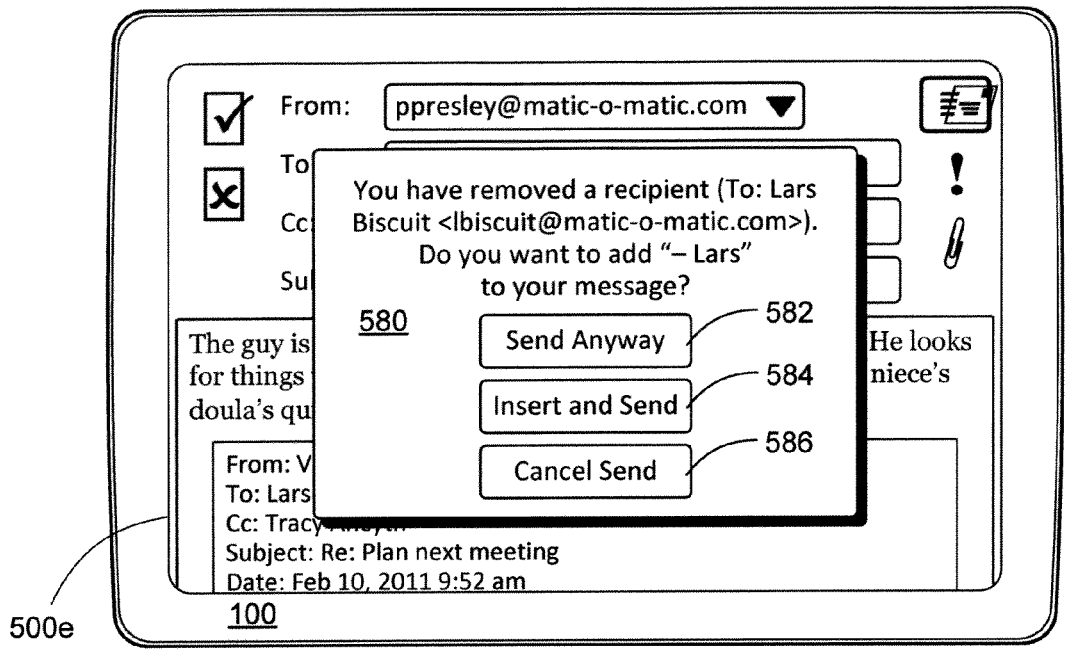

FIG. 5C is an example of the message composition screen 500c as it might appear in place of FIG. 5A after a reply to the message $M_2$ has been initiated. In this case, the initial set of recipients is left unaltered, and message body content 321d is first input in the message body entry field 440, which is in focus. Since there was no movement of focus from a recipient identifier entry field to the message body entry field, a comparison of the currently specified recipient set with the initial set was not triggered. Subsequently, as shown in the screen 500d of FIG. 5D, focus is moved to the recipient identifier entry field 434, where the second recipient, user 301, is deleted. The currently specified set of recipients has now changed from the initial state. If the send command is then invoked from this state, this triggers the comparison as described above, and express confirmation of the addition of an indicator of the change is then sought as shown in the screen 500e of FIG. 5E. In FIG. 5E, a dialog box 580, similar to the dialog box 480, is displayed to solicit input from the user prior to executing or aborting the message action in response to the triggering event. Thus, options include sending the message without inserting an indicator 582; inserting the proposed indicator and sending 584; and cancelling the send action, and returning to the message composition screen 586.

In some examples, the deletion of a recipient from a recipient identifier entry field is accompanied by insertion of this same deleted recipient into a blind carbon copy (Bcc:) field. In this manner, the deleted recipient (in this case, user 301) still receives at least one further message, which indicates to him that he has been "removed" from the message thread, since the other recipients in the thread will have received a message that does not purport to identify the user 301 as a recipient. In embodiments that insert the deleted recipient identifier as a Bcc: recipient, the messaging application may also be configured to insert an indicator that the user 301 was blind carbon copied on the message.

The above examples were described in the context of a reply-all command, described above, which is a form of reply command. However, in some cases, the new child message that is generated is initiated in response to a simple reply command (i.e., one in which the reply message is initially addressed only to the sender of the previous message) or a forward command (in which no recipients are initially automatically specified by the messaging application). In some instances, the user sending this new reply or forward message may intend to maintain some or all of the participants in the message thread, even though a reply-all command was not selected. This is illustrated in FIGS. 6A and 6B.

Figure 6A:
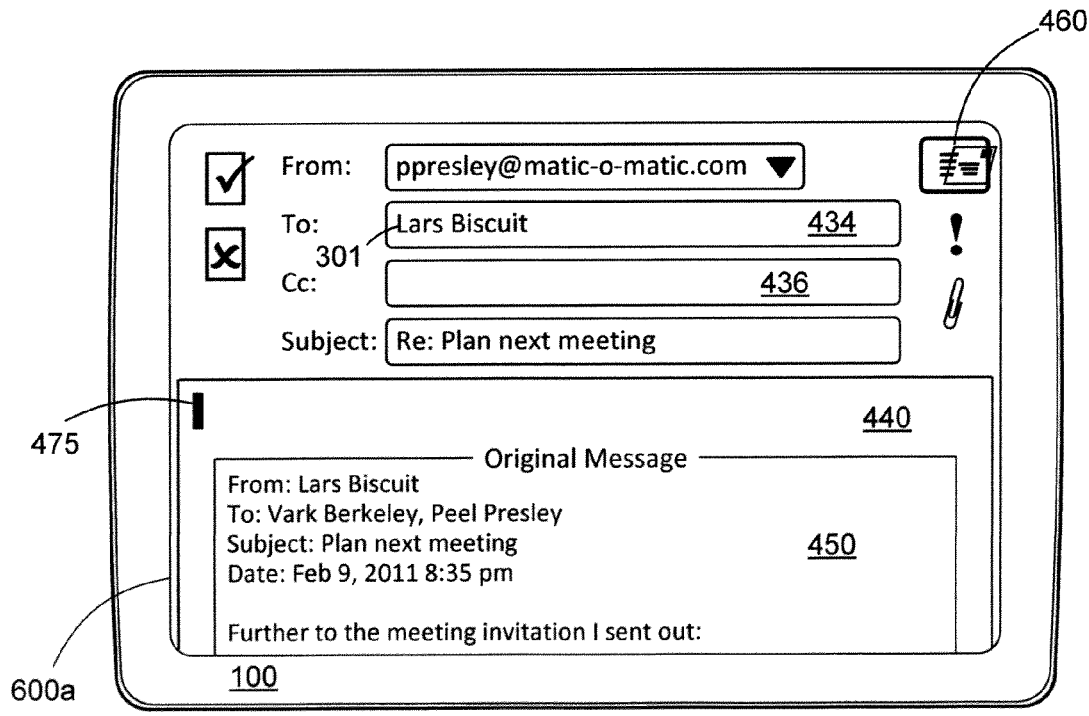
FIGS. 6A and 6B are illustrations of example message composition screens depicting automated insertion of an indicator of a recipient change.
Figure 6B:
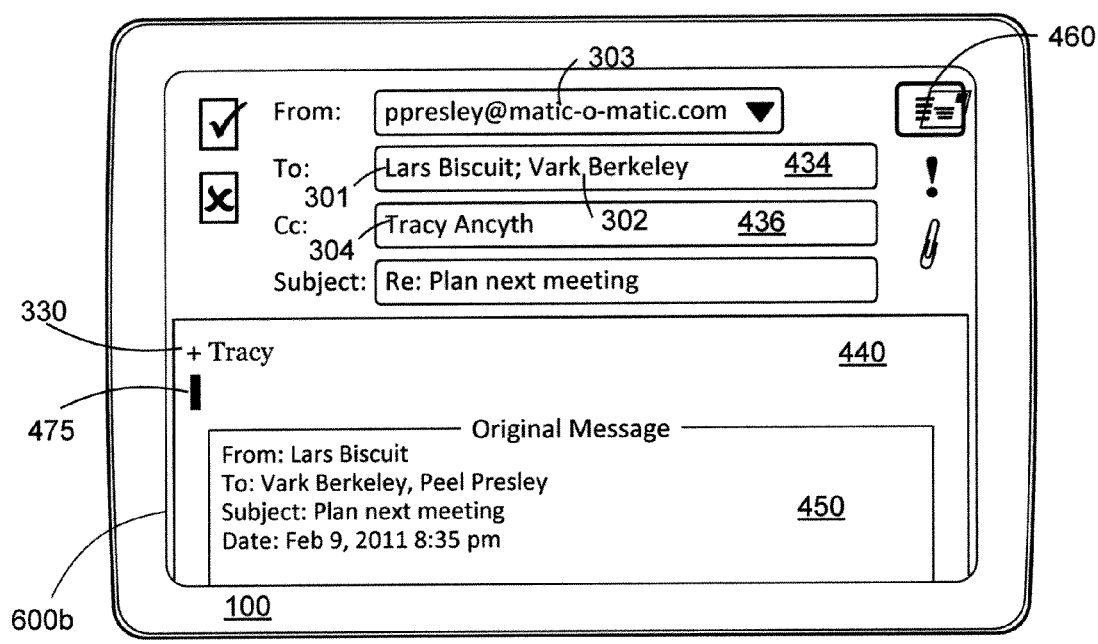

FIG. 6A depicts a further message composition screen 600a, which may be considered to be an alternate view of the message composition screen 400b of FIG. 4B, in which a simple reply command was invoked; thus, only the user 301 is designated as a recipient of the reply message in the initial recipient set pre-populating the input fields of the screen, although the parent message $M_0$ to which this is a reply included another participant 302. In a subsequent action, the user composing the message adds the user 302 as a recipient of the reply message in field 434, and also adds user 304 as a further recipient in field 436. When, as shown in the screen 600b of FIG. 6B, focus is then moved to the message body entry field 440 (in a manner similar to that shown in FIGS. 5A and 5B), a comparison is triggered to determine any changes to the recipients that should be reflected in the message body. In this case the triggered comparison is not a comparison between the initial recipient set specified for this particular reply message (i.e., the set of recipients used to pre-populate the message composition screen 600a) and the current recipient set; rather, it is a comparison between the participants in the message thread, as defined by the parent message, and the currently specified recipients. Thus, in this example only one new recipient 304 has been added, since user 302 was a previous participant. Therefore the indicator 330 inserted in the message body content only indicates addition of user 304. The trigger event may also be detection of the send command, as described before. The determination of the participants in the message thread may be carried out by identifying the parent message based on reference or In-Reply-To generated for the reply message, if available; or it may be determined by matching other characteristics of the reply message, such as the subject line, with stored messages to identify an existing message thread to which the reply message belongs, as described above.

Figure 7:
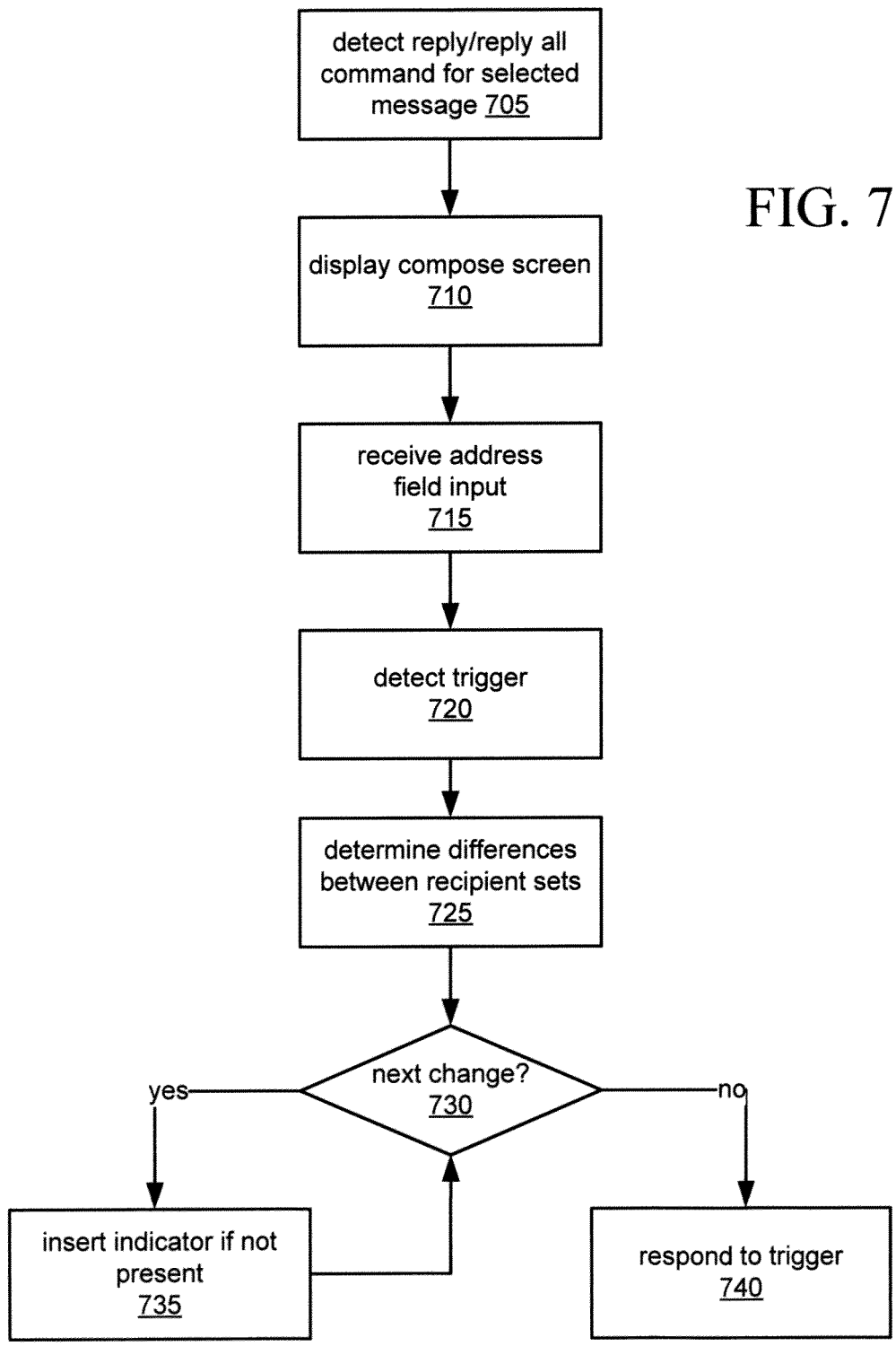
FIG. 7 is a flowchart illustrating a method for inserting an indicator of a recipient change in a message composed for outbound transmission.

FIG. 7 provides an outline of a method that may be implemented by the messaging application. At 705, a reply or reply-all command is detected for a selected parent message. This command need not be a reply or reply-all command; as noted above, it may be a forward command. Indeed, if membership in a given message thread is determined by factors other than a reference or In-Reply-To value in the message header of a message, such as the subject line, then the command need not be a reply or forward command at all; it may instead simply be a command to compose a new message; membership of the new message in any existing thread may be determined once content has been input for a subject line for the message. At 710, a message composition screen is displayed, and at 715 some address field input is received. This input may be the entry of a new recipient or recipients, or it may be the removal of an existing recipient or recipients. At 720, a triggering action is detected. This trigger may be the detection of a send command or movement of focus away from a recipient identifier input field, as mentioned above; it may include other acts, such as the detection of an instruction to validate any data entered in a recipient identifier entry field (e.g., to determine that it comprises a valid email address). In response to the trigger, a determination of any differences between the initial recipient set and the current recipient set is carried out at 725. The result may be zero or more differences (changes) between the recipient sets. If there is a next change to be handled at 730, then at 735 an indicator is inserted in the message body as necessary, if one is not already present or this change has not already been addressed in an earlier iteration. If all detected changes have been addressed, then at 740 the messaging application responds to the trigger with the appropriate action, such as sending the message. If the trigger is a send command, the action need not be actual sending of the message; instead, the corresponding action may be an initiation of sending, such as storing the message, placing the message in an outbound message queue, or another intermediate step that is carried out prior to actual transmission of the message.

Figure 8:
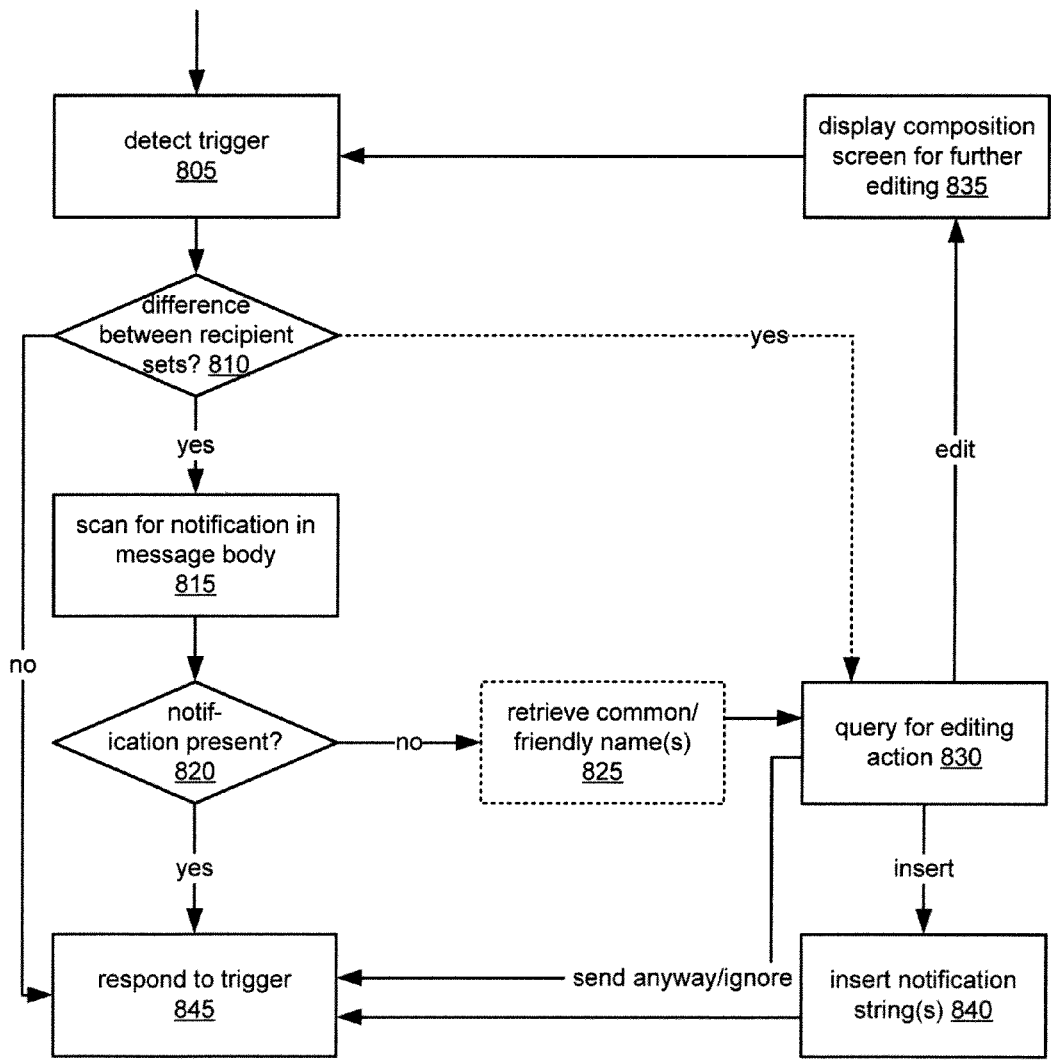
FIG. 8 is a further flowchart illustrating example aspects of the method of FIG. 7 in further detail.

FIG. 8 illustrates the method of inserting the indicator in further detail. At 805, the trigger is detected; at 810, a determination is made whether there is a difference between the current and the initial recipient set, for example by means of one of the comparisons described above. In still a further example, a comparison is not actually carried out; rather, the messaging application tracks each change made to the recipient identifier entry fields during the course of editing the message, so that comparison is not necessary.

If there is a difference between the recipient sets, then at 815 the message body may be scanned for an existing notification or indicator. If an indicator is determined to be present at 820, then the messaging application responds to the trigger as usual at 845. Otherwise, the method proceeds with 825. The determination whether an indicator is already present may be implemented using the aforementioned flag, which indicates that an indicator had already been inserted or suggested, or else by scanning the first lines of the message body for a string beginning with a recognizable token. Alternatively, the scanning 815 and determination at 820 may be skipped and the method may pass from 810 to optional step 825, in which friendly names corresponding to the changed recipients in the current recipient set are optionally retrieved for use in an indicator.

Next, at 830 the user may be queried regarding the insertion of a proposed indicator, including the token and one or more associated recipient identifiers, such as the retrieved friendly names. If the option of cancelling the insertion and returning to editing is selected, then the process returns to 835, where the composition screen is again displayed. If the option of inserting the proposed indicator is selected, then at 840 the indicator or indicators are inserted, and the messaging application may then respond to the trigger 845 with the usual action. Finally, if the user response is to ignore the proposed indicator (e.g., send the message anyway), then the process again moves to 845 to respond to the trigger 845 with the usual action.

The foregoing examples thus illustrate an electronic device, method and system in which the message body of a message (such as an email message) is selectively edited to reflect changes in the participants designated with that message.

It should be understood that steps and the order of the steps in the processing described herein may be altered, modified and/or augmented and still achieve the desired outcome. Throughout the specification, terms such as "may" and "can" are used interchangeably and use of any particular term should not be construed as limiting the scope or requiring experimentation to implement the claimed subject matter or embodiments described herein.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. Various functional units described herein have been expressly or implicitly described as modules and agents, in order to more particularly emphasize their independent implementation and operation. It is also noted that an agent, module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The various functional units may be implemented in hardware circuits such as custom VLSI circuits or gate arrays; field-programmable gate arrays; programmable array logic; programmable logic devices; commercially available logic chips, transistors, and other such components. Modules implemented as software for execution by a processor or processors may comprise one or more physical or logical blocks of code that may be organized as one or more of objects, procedures, or functions. The modules need not be physically located together, but may comprise code stored in different locations, such as over several memory devices, capable of being logically joined for execution. Modules may also be implemented as combinations of software and hardware, such as a processor operating on a set of operational data or instructions.

A portion of the disclosure of this patent document contains material which is or may be subject to one or more of copyright, design patent, industrial design, or unregistered design protection. The rights holder has no objection to the reproduction of any such material as portrayed herein through facsimile reproduction of the patent document or patent disclosure, as it appears in the Patent and Trademark Office patent file or records, but otherwise reserves all rights whatsoever.

The invention claimed is:

1. A method implemented at an electronic device, the method comprising:
   displaying, by the electronic device, a message composition screen for a new reply message in a message thread, the message composition screen comprising at least one recipient identifier entry field;
   receiving input from a user of the electronic device for the new reply message, the input comprising specification of at least one participant that is added to the at least one recipient identifier entry field as a recipient of the new reply message and new content for a message body of the new reply message;
   after receiving the specification of the at least one participant that is added:
      comparing a current set of participants specified for the new reply message with a previous set of participants specified for a previous message of the message thread, to detect any difference between the current set and the previous set; and if a difference is detected, inserting an indicator of the difference in a message body of the new reply message, the indicator indicating the at least one participant that is added and the message body of the new reply message including the new content; and initiating sending of the new reply message including the indicator to the current set of one or more participants.

2. The method of claim 1, wherein the new reply message and the previous message are both email messages.

3. The method of claim 1, wherein method further comprises, prior to receiving the input:
specifying an initial set of one or more recipients for the new reply message, the initial set being obtained from the previous set of one or more participants.

4. The method of claim 3, wherein the current set of one or more participants comprises a sender and any recipients of the new reply message and the previous set of one or more participants comprises a sender and any recipients of the previous message.

5. The method of claim 4, wherein the sender of the new reply message is a recipient of the previous message, and the comparing excludes the sender of the new reply message.

6. The method of claim 1, wherein the comparing and inserting are carried out in response to a trigger detected at the electronic device.

7. The method of claim 1, wherein inserting the indicator is carried out upon receipt of a confirmation instruction.

8. The method of claim 1, further comprising inserting an indicator of the difference in a header of the new reply message.

9. An electronic device, comprising:
a display interface;
at least one communications subsystem;
at least one user interface input mechanism; and
a processor in communication with the display interface, the at least one communications subsystem, and the at least one user interface input mechanism, the processor being configured to:
display, via the display interface, a message composition screen for a new reply message in a message thread, the message composition screen comprising at least one recipient identifier entry field;
receive input from a user of the electronic device for the new reply message via the at least one user interface input mechanism, the input comprising specification of at least one participant that is added to the at least one recipient identifier entry field as a recipient of the new reply message and new content for a message body of the new reply message;
after receiving the specification of the at least one participant that is added:
compare a current set of participants specified for the new reply message with a previous set of participants specified for a previous message of the message thread, to detect any difference between the current set and the previous set; and
if a difference is detected, insert an indicator of the difference in a message body of the new reply message, the indicator indicating the at least one participant that is added and the message body of the new reply message including the new content; and
initiate sending of the new reply message including the indicator to the current set of one or more participants.

10. The electronic device of claim 9, wherein the new reply message and the previous message are both email messages.

11. The electronic device of claim 9, wherein:
the processor is further configured to specify an initial set of one or more recipients for the new reply message prior to receipt of the input, the initial set being obtained from the previous set of one or more participants; and
the current set of one or more participants comprises a sender and any recipients of the new reply message and the previous set of one or more participants comprises a sender and any recipients of the previous message.

12. The electronic device of claim 11, wherein the sender of the new reply message is a recipient of the previous message, and the comparison excludes the sender of the new reply message.

13. The electronic device of claim 9, wherein inserting the indicator is carried out upon receipt of a confirmation instruction.

14. A non-transitory electronic device-readable medium bearing code which, when executed by an electronic device, causes the electronic device to carry out the method of:
displaying, by the electronic device, a message composition screen for a new reply message in a message thread, the message composition screen comprising at least one recipient identifier entry field;
receiving input from a user of the electronic device for a new reply message to be sent, the input comprising specification of at least one participant that is added to the at least one recipient identifier entry field as a recipient of the new reply message and new content for a message body of the new reply message;
after receiving the specification of the at least one participant that is added:
comparing a current set of participants specified for the new reply message with a previous set of participants specified for a previous message of the message thread, to detect any difference between the current set and the previous set; and
if a difference is detected, inserting an indicator of the difference in a message body of the new reply message, the indicator indicating the at least one participant that is added and the message body of the new reply message including the new content; and
initiating sending of the new reply message including the indicator to the current set of one or more participants.

15. The non-transitory electronic device-readable medium of claim 14, wherein the new reply message and the previous message are both email messages.

16. The non-transitory electronic device-readable medium of claim 14, wherein:
the method further comprises specifying an initial set of one or more recipients for the new reply message prior to receipt of the input, the initial set being obtained from the previous set of one or more participants; and
the current set of one or more participants comprises a sender and any recipients of the new reply message and the previous set of one or more participants comprises a sender and any recipients of the previous message.

17. The non-transitory electronic device-readable medium of claim 16, wherein the sender of the new reply message is a recipient of the previous message, and the comparison excludes the sender of the new reply message.

18. The non-transitory electronic device-readable medium of claim 14, wherein inserting the indicator is carried out upon receipt of a confirmation instruction.

* * * * *